US012361773B2

(12) United States Patent
Trapani et al.

(10) Patent No.: US 12,361,773 B2
(45) Date of Patent: Jul. 15, 2025

(54) MULTI-MODE ELECTRONIC ACCESS CONTROL SYSTEM AND METHOD

(71) Applicant: Security Enhancement Systems, LLC, Northbrook, IL (US)

(72) Inventors: Matthew Frank Trapani, Deerfield, IL (US); Philip J. Ufkes, Sullivan's Island, SC (US)

(73) Assignee: Security Enhancement Systems, LLC, Northbrook, IL (US)

( * ) Notice: Subject to any disclaimer, the term of this patent is extended or adjusted under 35 U.S.C. 154(b) by 243 days.

(21) Appl. No.: 18/131,655

(22) Filed: Apr. 6, 2023

(65) Prior Publication Data

US 2023/0326269 A1 Oct. 12, 2023

Related U.S. Application Data

(60) Provisional application No. 63/328,259, filed on Apr. 6, 2022.

(51) Int. Cl.
*G07C 9/00* (2020.01)

(52) U.S. Cl.
CPC ................................ *G07C 9/00174* (2013.01)

(58) Field of Classification Search
CPC .................................................. G07C 9/00174
See application file for complete search history.

(56) References Cited

U.S. PATENT DOCUMENTS

| | | | | |
|---|---|---|---|---|
| 6,728,612 | B1 * | 4/2004 | Carver | H04L 43/50 701/34.3 |
| 8,943,187 | B1 * | 1/2015 | Saylor | G07C 9/00857 709/225 |
| 9,582,648 | B2 * | 2/2017 | Wolfram | G06F 21/608 |
| 10,679,441 | B2 * | 6/2020 | Lai | G07C 9/00309 |
| 10,680,811 | B1 * | 6/2020 | Stanton | H04L 9/0819 |
| 10,882,492 | B2 * | 1/2021 | Bartels | G07C 9/00571 |
| 11,151,815 | B2 * | 10/2021 | Suzuki | H04W 12/08 |
| 11,348,396 | B2 * | 5/2022 | Meruva | G07C 9/00309 |

(Continued)

OTHER PUBLICATIONS

International Search Report, International application No. PCT/US23/17739. Date of mailing: Jul. 26, 2023. ISA/US, Alexandria, VA.

(Continued)

*Primary Examiner* — Steven Lim
*Assistant Examiner* — Son M Tang
(74) *Attorney, Agent, or Firm* — Gregory Finch; Finch Paolino, LLC

(57) ABSTRACT

A multi-mode electronic access control (EAC) system and method. Embodiments of the present disclosure provide for an EAC system operable to configure one or more operational modes comprising different levels of security, uses and software capabilities for one or more EAC devices deployed within an access-controlled site. The one or more operational modes may be associated with different user roles, functions and security parameters and may be configured and effected according to one or more phases in an EAC implementation process. Certain embodiments of the present disclosure enable one or more dynamic modes for one or more EAC devices according to one or more user-generated inputs and/or one or more mode parameters or conditions.

19 Claims, 12 Drawing Sheets

(56) References Cited

U.S. PATENT DOCUMENTS

| | | | | |
|---|---|---|---|---|
| 11,423,718 | B2 * | 8/2022 | Lee | G07C 9/00571 |
| 2002/0180582 | A1 | 12/2002 | Nielsen | |
| 2005/0057321 | A1 * | 3/2005 | Peterson | H01P 1/047 333/34 |
| 2007/0296545 | A1 | 12/2007 | Clare | |
| 2008/0068162 | A1 * | 3/2008 | Sharma | G08B 25/008 340/545.7 |
| 2008/0191009 | A1 * | 8/2008 | Gressel | H04W 4/021 235/382 |
| 2011/0311052 | A1 | 12/2011 | Myers et al. | |
| 2013/0326595 | A1 | 12/2013 | Myers et al. | |
| 2016/0019735 | A1 | 1/2016 | Myers et al. | |
| 2016/0116510 | A1 * | 4/2016 | Kalous | G07C 9/00571 340/636.1 |
| 2016/0308859 | A1 | 10/2016 | Barry et al. | |
| 2017/0096123 | A1 * | 4/2017 | Gennermann | B60R 25/241 |
| 2017/0098335 | A1 | 4/2017 | Payack, Jr. | |
| 2017/0256111 | A1 * | 9/2017 | Chung | G07C 9/32 |
| 2019/0108116 | A1 * | 4/2019 | Benes | G06F 11/3696 |

OTHER PUBLICATIONS

Written Opinion of the International Searching Authority, International application No. PCT/US23/17739. Date of mailing: Jul. 26, 2023. ISA/US, Alexandria, VA.

De Young, Glen, "Electronic Access Control Explained from A to Z." Online blog, Pacom Systems Pty Ltd. Aug. 8, 2019. Viewed online at https://pacom.com/us/news-and-events/electronic-access-control-explained-from-a-to-z-2/.

* cited by examiner

MULTI-MODE ELECTRONIC ACCESS CONTROL SYSTEM AND METHOD

CROSS-REFERENCE TO RELATED APPLICATIONS

This application claims priority benefit of U.S. Provisional Application Ser. No. 63/328,259, filed Apr. 6, 2022, entitled "MULTI-MODE ELECTRONIC ACCESS CONTROL SYSTEM AND METHOD"; the entirety of which is hereby incorporated herein at least by virtue of this reference.

FIELD

The present disclosure relates to the field of electronic access control systems; in particular, a multi-mode electronic access control system comprising various operational modes with differing levels of security.

BACKGROUND

Electronic access control (EAC) uses electronic hardware and software to solve the limitations of mechanical locks and keys. A wide range of credentials can be used to replace mechanical keys. The electronic access control system grants access based on the credential presented. When access is granted, the door is unlocked for a predetermined time and the transaction is recorded. When access is refused, the door remains locked, and the attempted access is recorded. The system will also monitor the door and alarm if the door is forced open or held open too long after being unlocked. Most electronic access control systems have limited modes of operation that fail to address the entire EAC system lifecycle. This results in inefficient user experiences and increased risk of security breaches for the EAC system.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a multi-mode electronic access control method comprising one or more steps or operations for configuring (e.g., with at least one processor) a plurality of operational modes for an electronic access control device. In certain embodiments, each operational mode in the plurality of operational modes may comprise a different set of parameters for operation of the electronic access control device. The parameters for operation of the electronic access control device may comprise one or more security parameters, user parameters, or functional parameters. The method may comprise one or more steps or operations for provisioning (e.g., with the at least one processor) the electronic access control device with the plurality of operational modes. The method may comprise one or more steps or operations for configuring (e.g., with the at least one processor) the electronic access control device according to a first mode of operation; and configuring (e.g., with at least one client device) the electronic access control device according to a second mode of operation. The second mode of operation may be configured according to one or more of the security parameters, user parameters, or functional parameters, wherein the second mode of operation is different from the first mode of operation.

In accordance with certain aspects of the present disclosure, the method may further comprise configuring (e.g., with the at least one client device) the electronic access control device according to a third mode of operation, wherein the third mode of operation is configured to restrict one or more functions of the electronic access control device according to one or more installation or testing parameters. The method may further comprise configuring (e.g., with the at least one client device) the electronic access control device according to a third mode of operation, wherein the second mode of operation is configured according to at least one first user role and the third mode of operation is configured according to at least one second user role. The method may further comprise configuring (e.g., with the at least one client device) the second mode of operation according to a first set of user parameters. The method may further comprise configuring (e.g., with the at least one client device) the second mode of operation according to a first set of site parameters. The method may further comprise configuring (e.g., with the at least one client device) the second mode of operation according to one or more installation or testing parameters. In certain embodiments, the first mode of operation comprises a first set of security parameters and the second mode of operation comprises a second set of security parameters. The first set of user parameters may be associated with a first user or a first user role. In certain embodiments, the third mode of operation may be configured according to one or more shared user roles.

Further aspects of the present disclosure provide for an electronic access control system comprising at least one first computing device; and an electronic access control device communicably engaged with the at least one first computing device, wherein the at least one first computing device comprises at least one processor and a non-transitory computer readable medium comprising processor-executable instructions stored thereon that, when executed, command the at least one processor to perform one or more operations of the multi-mode electronic access control method. In accordance with certain embodiments, the one or more operations comprise operations for configuring a plurality of operational modes for the electronic access control device. Each operational mode in the plurality of operational modes may comprise a different set of parameters for operation of the electronic access control device. The parameters for operation of the electronic access control device may comprise one or more security parameters, user parameters, or functional parameters. In accordance with certain embodiments, the one or more operations may comprise operations for provisioning the electronic access control device with the plurality of operational modes. The one or more operations may comprise operations for configuring the electronic access control device according to a first mode of operation. The plurality of operational modes may comprise at least one second mode of operation. The electronic access control device may be configurable between the first mode of operation and the at least one second mode of operation. In certain embodiments, the at least one second mode of operation is configured according to one or more of the security parameters, user parameters, or functional parameters, wherein the at least one second mode of operation is different from the first mode of operation.

In accordance with certain embodiments, the electronic access control system may further comprise at least one client device communicably engaged with the electronic access control device via at least one data transfer interface. The at least one client device may be operably configured to configure the electronic access control device from the first mode of operation to the at least one second mode of operation. The at least one second mode of operation may comprise a first set of user parameters that are different from the first mode of operation. The at least one second mode of operation may comprise a first set of site parameters that are different from the first mode of operation. The at least one second mode of operation may comprise one or more installation or testing parameters that are different from the first mode of operation.

Still further aspects of the present disclosure may comprise a multi-mode electronic access control system comprising a server and an electronic access control device communicably engaged with the server. In certain embodiments, the electronic access control device is configurable according to a plurality of operational modes. Each operational mode in the plurality of operational modes may comprise a different set of parameters for operation of the electronic access control device. The parameters for operation of the electronic access control device may comprise one or more security parameters, user parameters, or functional parameters. In certain embodiments, the electronic access control device is configured according to a first mode of operation. The server may be configured to configure the electronic access control device from the first mode of operation to a second mode of operation. The second mode of operation may be configured according to one or more of the security parameters, user parameters, or functional parameters, wherein the second mode of operation is different from the first mode of operation.

In accordance with certain embodiments, the electronic access control system may further comprise at least one client device communicably engaged with the electronic access control device and the server. The at least one client device may be configured to configure the electronic access control device from the first mode of operation to the second mode of operation. The second mode of operation may comprise one or more installation or testing parameters that are different from the first mode of operation. The second mode of operation may comprise a first set of user parameters that are different from the first mode of operation.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged, or otherwise in an abstracted format, to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The systems and methods of the present disclosure may be better understood from the following illustrative description with reference to the following drawings in which.

DETAILED DESCRIPTION

Figure 1:
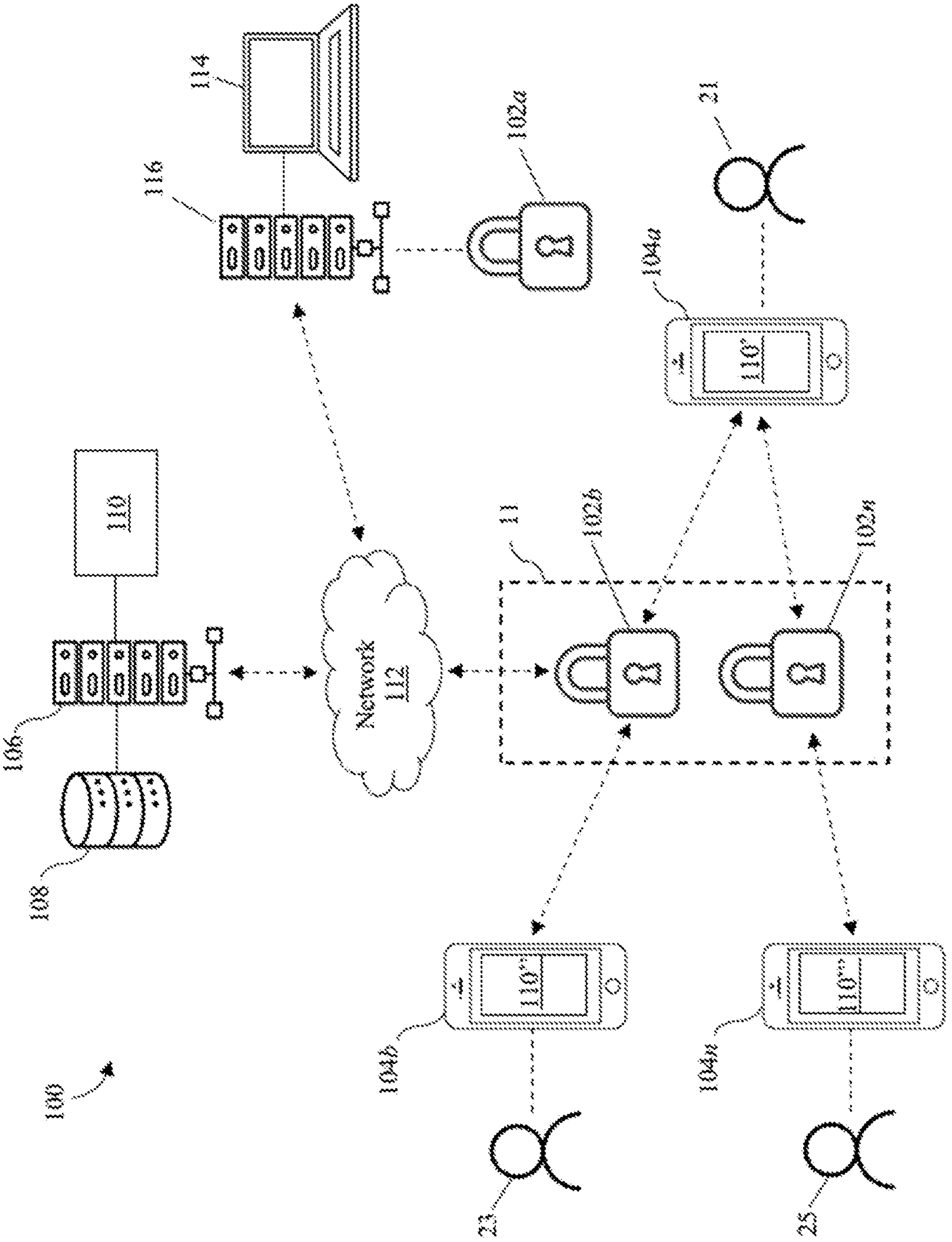
FIG. 1 is an architecture diagram of a multi-mode electronic access control system, in accordance with certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof. The term "interface" may be further defined as any shared boundary or connection between two dissimilar objects, devices or systems through which information or power is passed and/or a mechanical, functional and/or operational relationship is established and/or accomplished. Such shared boundary or connection may be physical, electrical, logical and/or combinations thereof.

As used herein, the term "packet" refers to any formatted unit of data that may be sent and/or received by an electronic device.

As used herein, the term "payload" refers to any part of transmitted data that constitutes an intended message and/or identifying information.

As used herein, the term "access control system" or "electronic access control system" refers to any system for restricting entrance to a property, a building, an area, a container, and/or a room to authorized persons through the use of at least one electronic access control device.

As used herein, the term "electronic access control device" or "access control device" refers to any electronic device that may be a component of an access control system, including: an access control panel (also known as a controller); an access-controlled entry, such as a door, turnstile, parking gate, elevator, or other physical barrier; a reader installed near the entry/exit of an access-controlled area; locking hardware, such as electric door strikes, electromagnetic locks, and electronically-actuated mechanical locks; a magnetic door switch for monitoring door position; and request-to-exit (REX) devices for allowing egress.

As used herein, the term "advertising" or "advertisement" refers to any transmitted packet configured to establish a data transfer interface between two electronic devices. An "advertising" or "advertisement" may include, but is not limited to, a BLE advertising packet transmitted by a peripheral device over at least one BLUETOOTH advertisement channel.

As used herein, the term "state machine" refers to a behavior model within an electronic access control system that is configured to process a given input according to a current state and perform a state transition and produce an output. In accordance with various aspects of the present disclosure, a state machine may comprise a finite number of states and may also be referred to as a finite-state machine (FSM). In accordance with various aspects of the present disclosure, a state machine may be defined wholly in a virtual environment and may also be referred to as a virtual finite-state machine (VFSM). A VFSM may provide a software specification method to describe the behavior of an electronic access control system using assigned names of input control properties and output actions. A VFSM method may comprise an execution model of an electronic access control system configured to facilitate one or more executable specification.

As used herein, the term "state" refers to a description of the status of a system that is waiting to execute a transition including at least one action or a set of actions to be executed when a condition is fulfilled or when an event is received.

As used herein, the term "mode" or "operational mode" refers to one or more program instructions, settings, controls and/or other parameters in which the same input produces different results in different modes within a device or system. In accordance with certain aspects of the present disclosure, a mode may comprise any mechanism that provides different users or user roles with different functionality/features than would otherwise fit into a program's main operational flow and/or that differ between a first mode and one or more subsequent mode.

Certain objects and advantages of the present disclosure include an electronic access control system that comprises multiple modes of operations for an electronic access control device being configured and managed at an electronic access control server to enable an efficient, traceable and secure deployment process for the electronic access control device within an end-to-end implementation of the electronic access control system (e.g., from manufacturing through installation, deployment and operation).

Certain exemplary embodiments of the present disclosure include a multi-mode EAC system comprising an EAC server, at least one EAC device, and at least one client device associated with at least one end user. The EAC server, the EAC device, and the client device may all be communicably engaged via at least one network interface or data transfer interface. In accordance with certain aspects of the present disclosure, the EAC system is operable to configure one or more operational modes comprising different levels of security, uses and software capabilities for the EAC device. The one or more operational modes may be associated with different user roles, functions and security parameters. The EAC server may provision the EAC device with firmware/software comprising one or more configuration parameters for the one or more operational modes. The client device may be communicably engaged with the EAC device via at least one data transfer interface (e.g., BLUETOOTH) to communicate an access request or other operational command to the EAC device. The EAC device may receive the request and communicate data associated with the request to the EAC server via the network interface. The EAC server may process the request, or other operational command, to determine an operational mode for the EAC device and one or more mode parameters for processing the request. The one or more mode parameters may include one or more security parameters, user privileges and/or device state/settings. The EAC server may return an output to the EAC device comprising a determination/disposition of the user access request or operational command, and the EAC device may perform one or more operations to grant or deny the access request and/or other operational command according to the output from the EAC server. The user device may receive a confirmation/denial of the user access request or other operational command from the EAC device and may provide an output to an end user confirming the same.

In accordance with certain aspects of the present disclosure, the EAC system may be operable to configure and administer one or more operational modes for one or more EAC devices comprising different levels of security, uses and software capabilities including one or more parameters, settings and/or controls, as shown and described in Table 1 below.

TABLE 1

Exemplary operational modes comprising security level, uses and software capabilities.

| Mode | Use | Description | Security | User Privileges |
|---|---|---|---|---|
| Manufacturing | Required | Core electronics and firmware creation and configuration parameters | Facility access only | Unlimited |
| Test | Required | Core functionality testing related to system, communications and locking | Facility access only | Unlimited |
| Final Assembly | Required | Configure system for shipping | Facility access only | Unlimited |
| Component Installation | Optional | Physical installing system on enclosure and perform integration testing | Facility access only | Limited system configuration capabilities. Testing functionality only. |
| On Site Installation | Optional | Physical installing system on enclosure and perform integration testing | Site access only | Limited system configuration capabilities. Testing functionality only. |
| Owner User Configuration | Required | Configuring system to owner user configuration | User access only | Owner user access only |
| Site Configuration | Required | Configuring system to site configuration | User access only | Owner or installer user access only |
| Tenant User Configuration | Optional | Configuring system to tenant user configuration | Owner, tenant user access only | Owner and tenant user access only |
| Shared User Configuration | Optional | Configuring system to shared multiple user site configuration | Owner, shared user access only | Owner and shared user access only |

Certain exemplary embodiments of the present disclosure include a multi-mode EAC method comprising one or more operations, steps and/or routines for configuring and administering one or more operational modes for one or more EAC devices comprising different levels of security, uses and software capabilities including one or more parameters, settings and/or controls. The multi-mode EAC method may include one or more steps or operations for configuring (e.g., with an EAC server) one or more operational modes and mode parameters for an EAC device. The multi-mode EAC method may proceed by performing one or more steps or operations for provisioning (e.g., with the EAC server) the EAC device according to the one or more operational modes and mode parameters. The multi-mode EAC method may proceed by performing one or more steps or operations for receiving (e.g., with the EAC device) a user input from an end user device. The user input may comprise an access request or an operational command for the electronic access control device. The multi-mode EAC method may proceed by performing one or more steps or operations for receiving and communicating (e.g., with the EAC device) the user input comprising an access request or an operational command for the electronic access control device to the electronic access control server. The multi-mode EAC method may proceed by performing one or more steps or operations for processing (e.g., with the EAC server) the user input according to the one or more operational modes and mode parameters to determine an output or response. The multi-mode EAC method may proceed by performing one or more steps or operations for granting or denying the access request or the operational command according to the one or more operational modes and mode parameters and returning an output to the EAC device and/or the user device.

Turning now descriptively to the drawings, in which similar reference characters denote similar elements throughout the several views, FIG. 1 is an architecture diagram of a multi-mode electronic access control system 100. In accordance with certain aspects of the present disclosure, system 100 is configured to configure a plurality of EAC devices 102*a-n* according to various operational modes comprising different levels of security, users privileges, and functional capabilities, and deploy EAC devices 102*a-n* (e.g., within an access-controlled site 11) according to said various operational modes. System 100 may comprise a manufacturer server 116 operably engaged with a manufacturer client 114 to configure the one or more operational modes for EAC devices 102*a-n*. System 100 may further comprise an EAC server 106 operably engaged with an EAC database 108. EAC server 106 may comprise an EAC application 110 comprising a plurality of processor-executable instructions configured to command at least one processor of EAC server 106 to perform the operations of a multi-mode electronic access control method, as described more fully herein. EAC server 106 may be communicably engaged with manufacturer server 116 via a network interface 112. As shown in FIG. 1, EAC device 102*b* and 102*n* may be deployed within an access-controlled site 11. System 100 may further comprise a plurality of client devices 104*a-n* associated with a plurality of users 21-25. In accordance with certain aspects of the present disclosure, the plurality of client devices 104*a-n* may be communicably engaged with EAC devices 102*a-n* according to the one or more operational modes to command one or more operations of EAC devices 102*a-n* within system 100.

In accordance with certain aspects of the present disclosure, manufacturer server 116 and manufacturer client 114 are operably configured to provision EAC devices 102*a-n* according to the one or more operational modes and/or deploy/transition EAC devices 102*a-n* between the one or more operational modes. As shown in FIG. 1, EAC device 102*a* is communicably engaged with manufacturer server 116 during one or more manufacturing, testing and final assembly phase of an EAC lifecycle. Manufacturer server 116 may be communicably engaged with manufacturer client 114 to configure one or more mode parameters for the one or more operational modes. The one or more mode parameters may include one or more functional parameters, user parameters and/or security parameters. In certain embodiments, the one or more operational modes may include, but are not limited to, a manufacturing mode, a testing mode, and a final assembly mode. In certain embodiments, the manufacturing mode may comprise certain parameters for configuring EAC device 102*a* in accordance with a manufacturing phase of an EAC lifecycle. In certain embodiments, the manufacturing mode may include one or more functional parameters related to core electronics and firmware creation and related configuration parameters. The manufacturing mode may include one or more security parameters configured to restrict access to EAC device 102*a* to only manufacturing facility devices (e.g., manufacturing client 114). The manufacturing mode may include one or more user parameters as relevant to the manufacturing process; for example, the manufacturing mode may include unlimited user privileges. In certain embodiments, the testing mode may comprise certain parameters for testing EAC device 102*a* in accordance with a testing phase of an EAC lifecycle. In certain embodiments, the testing mode may include one or more functional parameters related to core functionality testing related to system controls, communications and locking functionality. The testing mode may include one or more security parameters configured to restrict access to EAC device 102*a* to only manufacturing facility devices (e.g., manufacturing client 114). The testing mode may include one or more user parameters as relevant to the testing process; for example, the testing mode may include unlimited user privileges. In certain embodiments, the final assembly mode may comprise certain parameters for final assembly of EAC device 102*a* in accordance with a final assembly phase of an EAC lifecycle. In certain embodiments, the final assembly mode may include one or more functional parameters related to configuring EAC device 102*a* for final assembly and shipping. The final assembly mode may include one or more security parameters configured to restrict access to EAC device 102*a* to only manufacturing facility devices (e.g., manufacturing client 114). The final assembly mode may include one or more user parameters as relevant to the final assembly process; for example, the final assembly mode may include unlimited user privileges.

In accordance with certain aspects of the present disclosure, EAC server 106 and client devices 104*a-n* are operably configured to provision EAC devices 102*a-n* according to the one or more operational modes. As shown in FIG. 1, EAC devices 102*b-n* may be installed and deployed within access-controlled site 11 and are communicably engaged with EAC server 106 and/or client devices 104*a-n* during one or more installation, deployment and/or operational phase of an EAC lifecycle. In accordance with certain embodiments, EAC server 106 may be communicably engaged with EAC devices 102*b-n* to configure one or more mode parameters for the one or more operational modes. The one or more mode parameters may include one or more functional parameters, user parameters and/or security parameters. In certain embodiments, the one or more operational modes may include, but are not limited to, a component installation mode, an on-site installation mode, an owner user configuration mode, a site configuration mode, a tenant user configuration mode and/or a shared user configuration mode.

In certain embodiments, the component installation mode and/or the on-site installation mode may comprise certain parameters for configuring, for example, EAC devices 102*b-n* in accordance with an installation phase of an EAC lifecycle. In accordance with certain aspects of the present disclosure, a first user 21 may comprise an installer user within system 100. Client device 104*a* may be configured to execute an instance 110' of EAC application 110 to enable first user 21 to command one or more operations of EAC devices 102*b-n* in accordance with the component installation mode and/or the on-site installation mode. In certain embodiments, the component installation mode and/or the on-site installation mode may include one or more functional parameters related to component installation and/or physical installation of EAC devices 102*b-n* at one or more enclosure or access point within access-controlled site 11; including, for example, one or more parameters for performing integration testing of EAC devices 102*b-n* within system 100. The component installation mode and/or the on-site installation mode may include one or more security parameters configured to restrict access to EAC devices 102*b-n* according to one or more site or location parameters. The component installation mode and/or the on-site installation mode may include one or more user parameters configured to restrict access and functions for one or more installation and testing user roles (e.g., first user 21).

In certain embodiments, the owner user mode, the owner-tenant user mode and/or the shared user mode may comprise certain parameters for configuring, for example, EAC devices 102*b-n* in accordance with deployment and operational phases of an EAC lifecycle. In accordance with certain aspects of the present disclosure, a second user 23 may comprise, for example, an owner user within system 100 and a third user 25 may comprise a tenant user or a shared user. Client device 104*b* may be configured to execute an instance 110" of EAC application 110 to enable second user 23 to command one or more operations of EAC devices 102*b* in accordance with the owner user mode, the owner-tenant user mode and/or the shared user mode. Client device 104*n* may be configured to execute an instance 110'" of EAC application 110 to enable third user to command one or more operations of EAC device 102*n* in accordance with the owner-tenant user mode and/or the shared user mode.

In certain embodiments, the owner user mode, the owner-tenant user mode and/or the shared user mode may include one or more functional parameters related to access controls and use of EAC devices 102*b-n* by one or more users (e.g., second user 23 and third user 25) within system 100. The owner user mode, the owner-tenant user mode and/or the shared user mode may include one or more security parameters configured to restrict access to EAC devices 102*b-n* according to one or more user security parameters (e.g., user authorization and authentication parameters). The owner user mode, the owner-tenant user mode and/or the shared user mode may include one or more user roles and privileges for an owner user (e.g., second user 23) and/or a tenant user or a shared user (e.g., third user 25).

In accordance with certain aspects of the present disclosure, EAC server 106 is configured to deploy EAC devices 102*b-n* according to the one or more operational modes and/or transition EAC devices 102*b-n* between a first operational mode and a second or subsequent operational mode. EAC application 110 may comprise one or more processor-executable operations configured to command at least one processor of EAC server 106 to deploy EAC devices 102*b-n* according to the one or more operational modes and/or transition EAC devices 102*b-n* between a first operational mode and a second or subsequent operational mode. In certain embodiments, EAC application 110 may comprise one or more operations of a virtual finite state machine. In said embodiments, each operational mode may comprise a different state in a state machine model. EAC application 110 may be configured to effect a state transition according to the state machine model to transition EAC devices 102*b-n* between a first operational mode and a second or subsequent operational mode in response to one or more inputs from one or more of client devices 104*a-n*.

Figure 2:
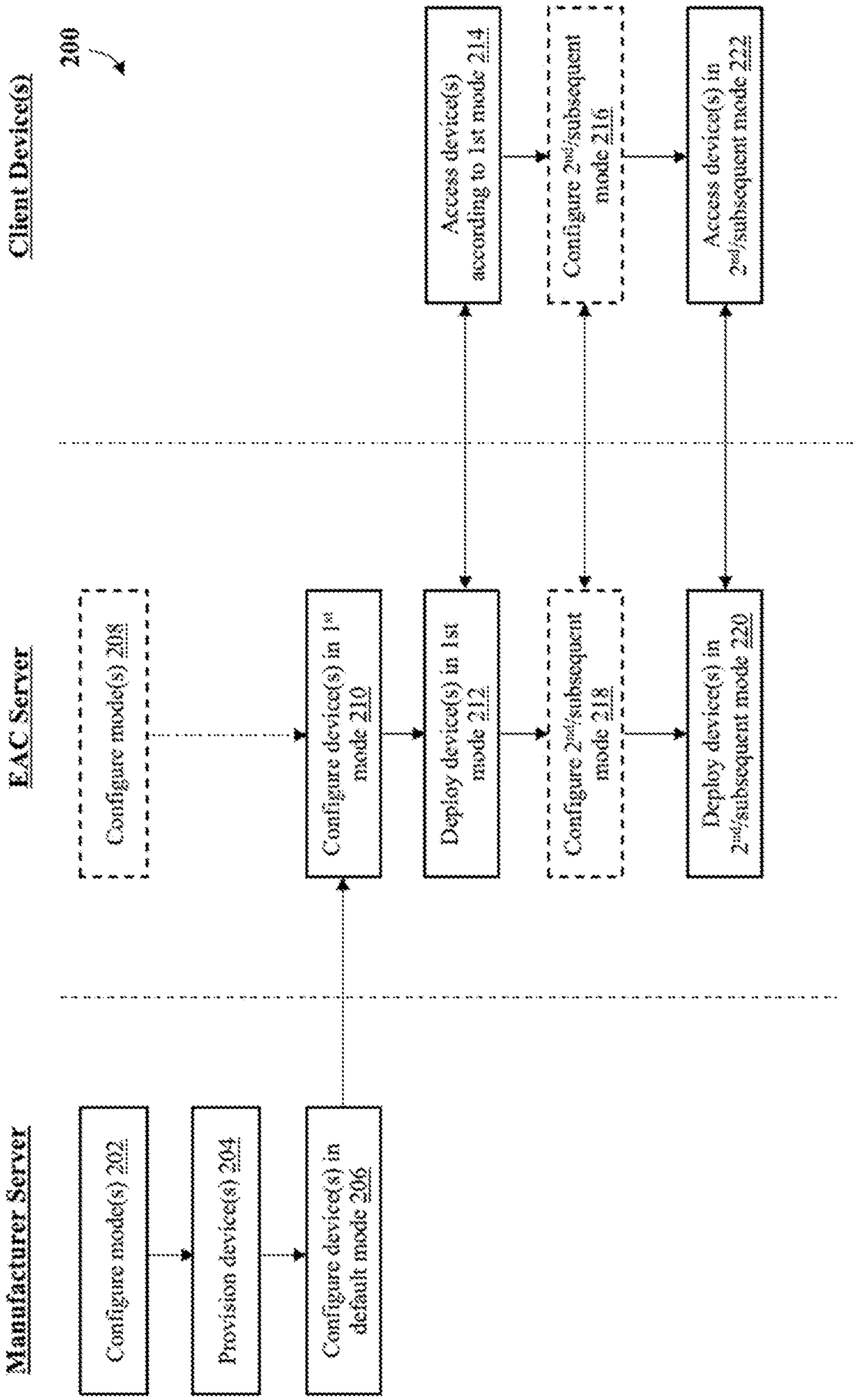
FIG. 2 is a functional block diagram of a multi-mode electronic access control system, in accordance with certain aspects of the present disclosure.

Referring now to FIG. 2, a functional block diagram 200 of a multi-mode electronic access control system is shown. In accordance with certain aspects of the present disclosure, the multi-mode electronic access control system may comprise system 100, as shown in FIG. 1. The multi-mode electronic access control system may comprise a manufacturer server (e.g., manufacturer server 116, as shown in FIG. 1), an EAC server (e.g., EAC server 106, as shown in FIG. 1), one or more EAC devices (e.g., EAC devices 102*a-n*, as shown in FIG. 1) and one or more client devices (e.g., client devices 104*a-n*, as shown in FIG. 1). In accordance with certain aspects of the present disclosure, a manufacturer server of system 200 may be configured to execute one or more steps or operations for configuring one or more operational modes for at least one EAC device (Block 202). In certain embodiments, the one or more operational modes comprise one or more functional parameters, security parameters and/or user parameters for each mode in the one or more operational modes. In certain embodiments, the one or more operational modes may include, but are not limited to, a manufacturing mode, a testing mode, and a final assembly mode. The manufacturer server may be configured to execute one or more steps or operations for provisioning a controller of the at least one EAC device with software, including firmware, for configuring and/or commanding one or more operations of the at least one EAC device according to the one or more operational modes (Block 204). The manufacturer server may be configured to execute one or more steps or operations for configuring the at least one EAC device in a default (i.e., first) mode of operation (Block 206). The default mode of operation may comprise the final assembly mode.

In accordance with certain aspects of the present disclosure, the at least one EAC device may be operably engaged within an EAC system associated with at least one access-controlled site. The EAC system may comprise an EAC server comprising at least one EAC application configured to configure, deploy and control a plurality of EAC devices at the access-controlled site. In accordance with certain embodiments, the EAC server may be operably configured to establish a communications/data transfer interface with the at least one EAC device. The EAC server may be configured to execute one or more steps or operations for configuring the one or more operational modes of the at least one EAC device (Block 208). The one or more operational modes may include one or more component installation mode, on-site installation mode, site configuration mode and/or owner user mode, owner-tenant user mode and/or shared user mode. In certain embodiments, the EAC server is communicably engaged with one or more client devices to receive/process one or more user-generated inputs received at the one or more client devices to configure the one or more operational modes. In accordance with certain aspects of the present disclosure, the EAC server may be configured to execute one or more steps or operations for configuring the at least one EAC device in accordance with a first mode of operation (Block 210). In certain embodiments the first mode of operation may comprise the default mode of operation. In certain embodiments, the first mode of operation may comprise the component installation mode, on-site installation mode, or site configuration mode (or other mode(s) in accordance with certain exemplary use cases and embodiments). The first operational mode may be configured to provide for limited functionality and user privileges for the at least one EAC device. For example, the first operational mode may restrict access rights for the least one EAC device to an owner user role and/or a testing user role and may restrict functionality for the least one EAC device to one or more installation and/or testing functions. The EAC server may be configured to execute one or more steps or operations for deploying the at least one EAC device according to the first mode of operation (Block 212). In accordance with certain embodiments, one or more client device may be configured to execute one or more steps or operations (e.g., via an EAC application executing on the client device) to access/control one or more functions of the at least one EAC device according to the first mode of operation (e.g., via at least one data transfer interface between the client device and the EAC device) (Block 214).

In accordance with certain aspects of the present disclosure, the EAC server and/or the one or more client device may execute one or more steps or operations to configure the at least one EAC device according to a second or subsequent mode of operation (Block 216), (Block 218). The second or subsequent mode of operation may comprise a different mode of operation to the first mode of operation, including one or more different user parameters, functional parameters, and/or security parameters to those of the first mode of operation. The second or subsequent mode of operation may comprise a site configuration mode and/or an owner user mode, owner-tenant user mode and/or shared user mode. The EAC server may execute one or more steps or operations to deploy the at least one EAC device in the second or subsequent mode of operation (Block 220). In accordance with certain embodiments, the one or more client device may be configured to execute one or more steps or operations (e.g., via an EAC application executing on the client device) to access/control one or more functions of the at least one EAC device according to the second or subsequent mode of operation (e.g., via at least one data transfer interface between the client device and the EAC device) (Block 222). In certain embodiments, the client device associated with Block 214 may comprise a different client device than that of Block 222. The client device associated with Block 214 may be associated with a first user role (e.g., an installation user) and the client device associated with Block 222 may be associated with a second or subsequent user role (e.g., an owner user or a tenant user). The EAC server may be configured to transition the at least one EAC device between the one or more operational modes in accordance with one or more inputs received from the EAC device and/or the client device, and/or in accordance with one or more static or dynamic conditions, rules and/or triggers.

Figure 3:
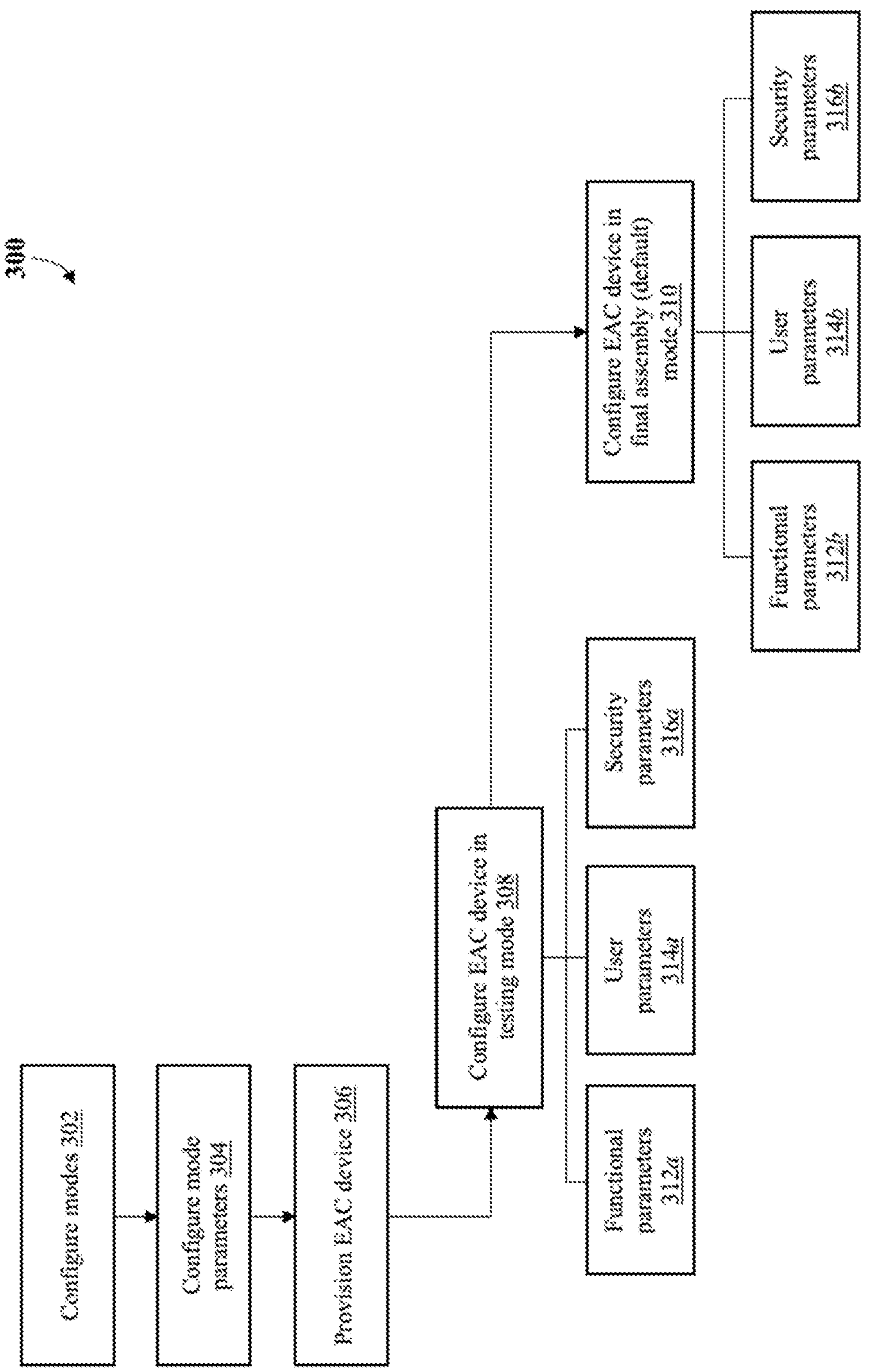
FIG. 3 is a process flow diagram of a routine of a multi-mode electronic access control system, in accordance with certain aspects of the present disclosure.

Referring now to FIG. 3, a process flow diagram of a routine 300 of a multi-mode electronic access control system is shown. In accordance with certain aspects of the present disclosure, routine 300 may comprise a routine of multi-mode electronic access control system 100, as shown in FIG. 1. In accordance with certain aspects of the present disclosure, routine 300 may comprise one or more operations executed on a manufacturing server of a multi-mode electronic access control system, such as manufacturing server 116 of FIG. 1. In accordance with certain aspects of the present disclosure, routine 300 may comprise one or more steps in a manufacturing process for one or more EAC devices; for example, EAC devices 102*a-n* as shown in FIG. 1.

In accordance with certain aspects of the present disclosure, routine 300 may comprise one or more steps or operations for configuring one or more operational modes for one or more EAC devices (Step 302). The one or more operational modes may include a manufacturing mode comprising one or more parameters for core electronics and firmware configuration for the one or more EAC devices. The one or more operational modes may include a testing mode and a final assembly mode. Routine 300 may comprise one or more steps or operations for configuring one or more mode parameters for the one or more operational modes (Step 304). The one or more mode parameters may include one or more functional parameters (i.e., parameters for controlling one or more functions or operations of the EAC device), user parameters (i.e., parameters for controlling one or more user privileges for one or more user roles) and/or security parameters (i.e., parameters for restricting access to one or more features or settings of the EAC device according to one or more conditions). Routine 300 may further comprise one or more steps or operations for provisioning the one or more EAC devices according to the one or more operational modes (Step 306).

In accordance with certain aspects of the present disclosure, a manufacturing process for the one or more EAC devices may comprise one or more testing steps or functions. Routine 300 may comprise one or more steps or operations for configuring the one or more EAC devices in a testing mode (Step 308). In certain embodiments, the testing mode may include one or more functional parameters 312*a* comprising one or more parameters related to core functionality testing, system control testing, communications testing, and locking functionality testing. The testing mode may include one or more user parameters 314*a* as relevant to the testing process; for example, the testing mode may include unlimited user privileges to enable testing of all functional aspects of the EAC device. The testing mode may include one or more security parameters 316*a* comprising one or more parameters configured to enable one or more access restrictions for the EAC device during one or more steps in the testing process. Routine 300 may proceed by configuring the EAC device in a final assembly mode according to one or more final assembly steps in the EAC manufacturing process (Step 310). In certain embodiments, the final assembly mode may comprise a default operational mode for the EAC device. The final assembly mode may include one or more functional parameters 312*b* related to configuring the EAC device for final assembly and shipping. The final assembly mode may include one or more user parameters 314*b* as relevant to the final assembly process; for example, the final assembly mode may include unlimited user privileges. The final assembly mode may include one or more security parameters 316*b* comprising one or more parameters configured to enable one or more access restrictions for the EAC device for final assembly and shipping.

Figure 4:
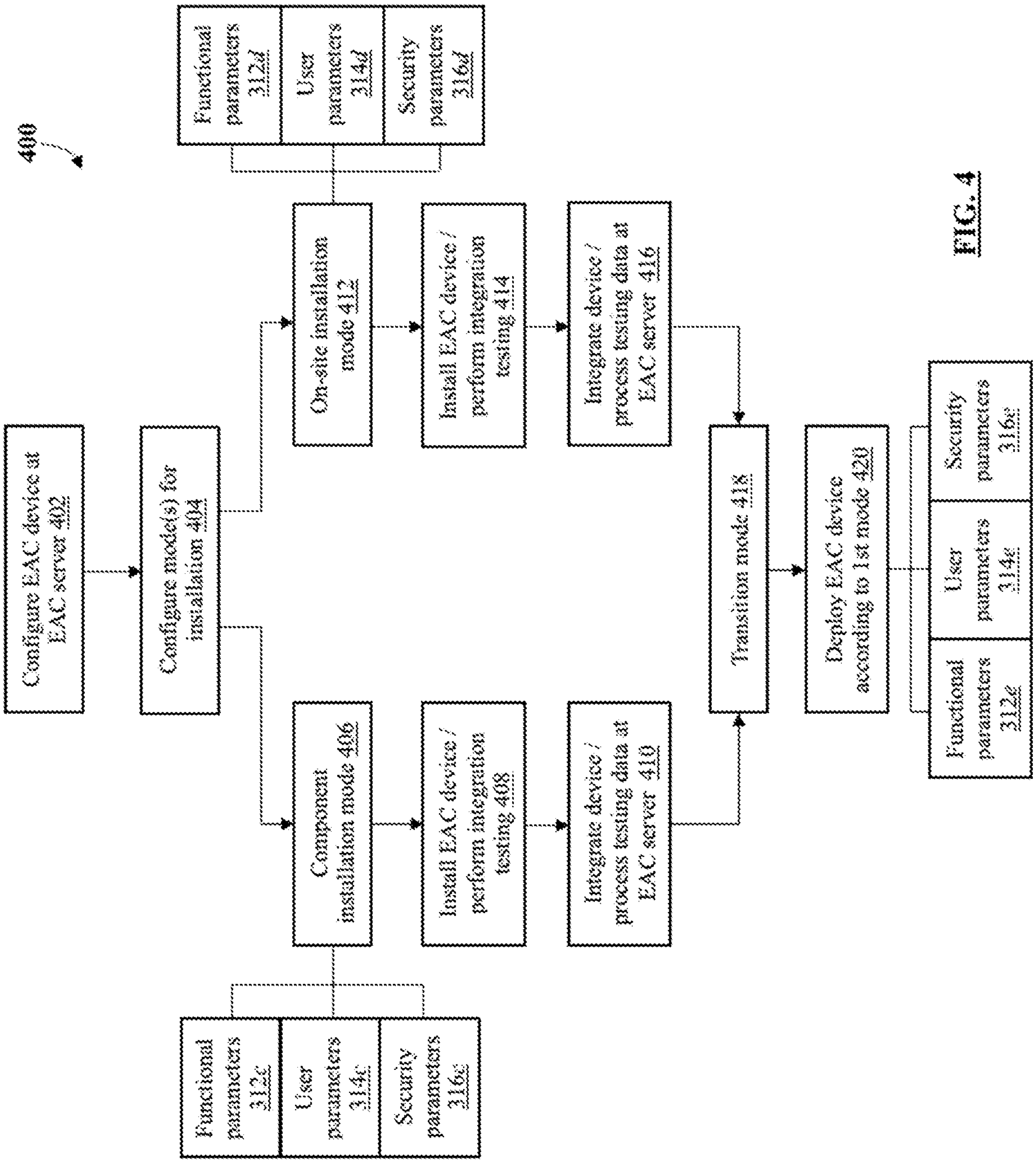
FIG. 4 is a process flow diagram of a routine of a multi-mode electronic access control system, in accordance with certain aspects of the present disclosure.

Referring now to FIG. 4, a process flow diagram of a routine 400 of a multi-mode electronic access control system is shown. In accordance with certain aspects of the present disclosure, routine 400 may comprise a routine of multi-mode electronic access control system 100, as shown in FIG. 1. Routine 400 may be successive/sequential to routine 300 of FIG. 3 and/or may comprise one or more sub-steps or sub-routines of routine 300 of FIG. 3. In accordance with certain aspects of the present disclosure, one or more steps or operations of routine 400 may be executed on an EAC server, such as EAC server 106 of FIG. 1.

In accordance with certain aspects of the present disclosure, routine 400 may be associated with one or more installation phase of the multi-mode electronic access control system. In accordance with certain embodiments, routine 400 may comprise one or more steps or operations for configuring an EAC device (e.g., EAC device 102*b* of FIG. 1) at an EAC server (e.g., EAC server 106 of FIG. 1) (Step 402). Step 402 may comprise one or more steps or operations for configuring the EAC device within an EAC application executing on the EAC server, including one or more steps or operations for establishing a data transfer interface between the EAC server and the EAC device. Routine 400 may proceed by executing one or more steps or operations for configuring one or more operational modes for installation of the EAC device within an access-controlled site (Step 404). In accordance with certain embodiments, the one or more operational modes for installation of the EAC device within the access-controlled site may comprise a component installation mode. In said embodiments, routine 400 may comprise one or more steps or operations for configuring the EAC device according to a component installation mode (Step 406). In certain embodiments, the component installation mode may comprise one or more functional parameters 312*c* comprising one or more parameters related to installation of one or more components of the EAC device within the EAC system and/or one or more parameters related to integration testing for one or more components of the EAC device within the EAC system. The component installation mode may include one or more user parameters 314*c* including limiting user privileges to only those privileges required for installation and testing of one or more components of the EAC device and/or limiting the user roles to one or more installer user or administrator user. The component installation mode may include one or more security parameters 316*c* comprising one or more parameters configured to enable one or more access restrictions for the EAC device during one or more steps in the component installation process. In accordance with certain aspects of the present disclosure, an administrator user or an installer user may install one or more components of the EAC device within the EAC system in accordance with the component installation mode (Step 408). Routine 400 may proceed by executing one or more steps or operations for executing one or more integration testing functions for the EAC device at the EAC server to confirm proper installation/configuration of the EAC device (Step 410). In accordance with certain embodiments, upon successful completion of component installation and integration testing, routine 400 may execute one or more steps or operations for transitioning the mode of operation for the EAC device from the component installation mode to a first mode of operation (Step 418). Routine 400 may proceed by executing one or more steps or operations for deploying the EAC device within the EAC system according to the first mode of operation (Step 420). In certain embodiments, the first mode of operation may comprise one or more functional parameters 312*e* comprising one or more parameters for establishing a data transfer interface with at least one client device, receiving an access request comprising at least one electronic access code and/or user credential from the at least one client device, and processing the access request to grant or deny access to at least one user. The first mode of operation may include one or more user parameters 314*e* associated with one or more authorized users and/or user roles. The first mode of operation may include one or more security parameters 316*e* comprising one or more parameters comprising one or more security protocols, safety or compliance conditions, system interdependencies, user restrictions, and the like.

In accordance with certain embodiments, the one or more operational modes for installation of the EAC device within the access-controlled site may comprise an on-site installation mode. In said embodiments, routine 400 may comprise one or more steps or operations for configuring the EAC device according to the on-site installation (Step 412). In certain embodiments, the on-site installation mode may comprise one or more functional parameters 312*d* comprising one or more parameters related to physical installation of the EAC device at an enclosure or access point of the access-controlled site and/or one or more parameters related to integration testing for the installed EAC device within the EAC system. The on-site installation mode may include one or more user parameters 314*d* including parameters for limiting user privileges to only those privileges required for on-site installation and testing of the EAC device and/or limiting the user roles to one or more installer user or administrator user. The on-site installation mode may include one or more security parameters 316*d* comprising one or more parameters configured to enable one or more access restrictions for the EAC device during one or more steps in the on-site installation process. In accordance with certain aspects of the present disclosure, an administrator user or an installer user may install the EAC device at the enclosure or access point of the access-controlled site in accordance with the on-site installation mode (Step 414). Routine 400 may proceed by executing one or more steps or operations for executing one or more integration testing functions for the EAC device at the EAC server to confirm proper installation/configuration of the EAC device (Step 416). In accordance with certain embodiments, upon successful completion of installation and integration testing, routine 400 may proceed to steps 418 and 420.

Figure 5:
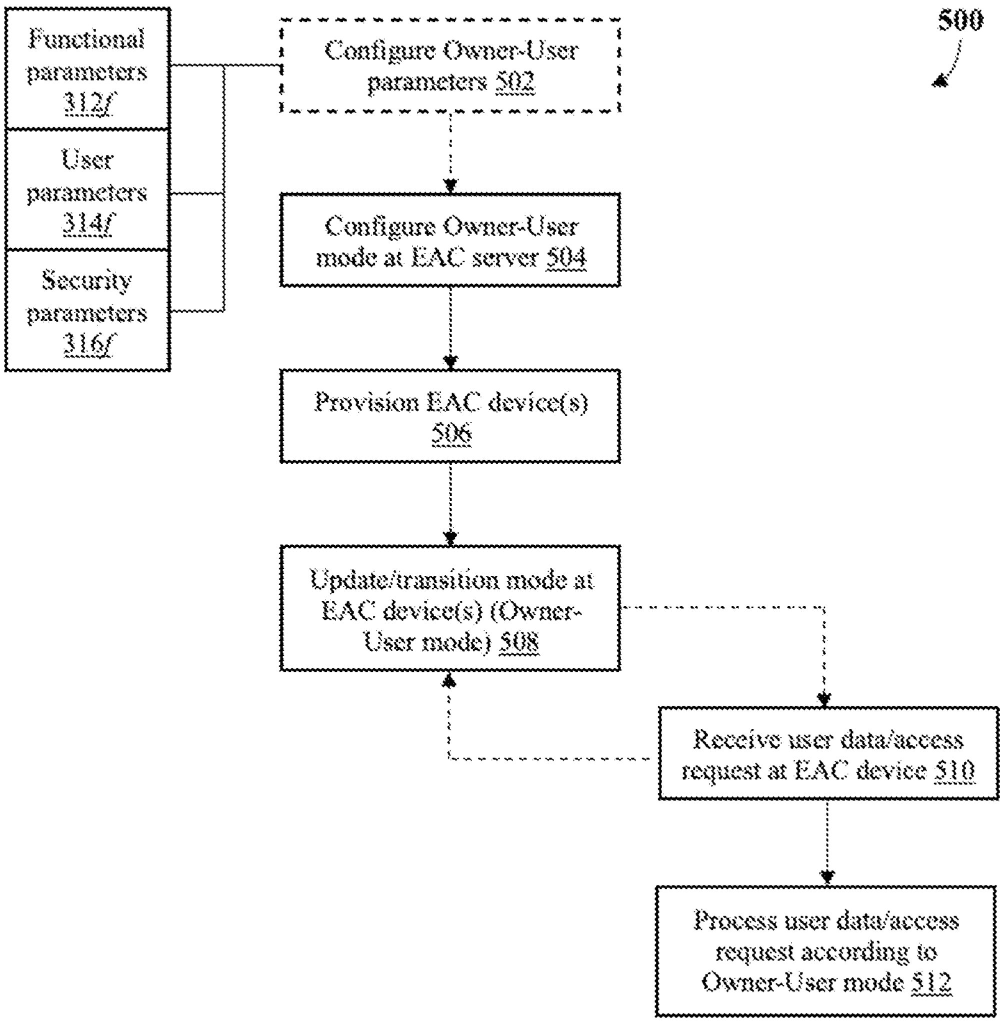
FIG. 5 is a process flow diagram of a routine of a multi-mode electronic access control system, in accordance with certain aspects of the present disclosure.

Referring now to FIG. 5, a process flow diagram of a routine 500 of a multi-mode electronic access control system is shown. In accordance with certain aspects of the present disclosure, routine 500 may comprise a routine of multi-mode electronic access control system 100, as shown in FIG. 1. Routine 500 may be successive/sequential to routine 300 of FIG. 3 and/or routine 400 of FIG. 4 and/or may comprise one or more sub-steps or sub-routines of routine 300 of FIG. 3 and/or routine 400 of FIG. 4. In accordance with certain aspects of the present disclosure, routine 500 may comprise one or more steps or operations 502-512 for configuring an EAC device according to an owner-user mode of operation. The owner-user mode of operation may comprise at least one mode in a plurality of separate/distinct modes within the multi-mode electronic access control system. In certain embodiments, the owner-user mode of operation may comprise the first mode of operation in step 420 in FIG. 4. In accordance with certain aspects of the present disclosure, the owner-user mode comprises one or more unique mode parameters for commanding/controlling one or more functions of the EAC device for at least one owner-user role. In accordance with certain aspects of the present disclosure, routine 500 may comprise one or more steps or operations for configuring one or more owner-user mode parameters (Step 502). Step 502 may comprise one or more steps or operations for configuring the one or more owner-user mode parameters via one or more operations of an EAC application (e.g., EAC application 110 in FIG. 1) executing on the EAC server (e.g., EAC server 116 in FIG. 1) and/or one or more client devices (e.g., client devices 104*a-n* in FIG. 1). Step 502 may comprise one or more steps or operations for receiving one or more user-generated inputs at the one or more client devices via a graphical user interface of the EAC application. Step 502 may comprise one or more steps or operations for configuring the one or more owner-user mode parameters at the EAC server in response to the one or more user-generated inputs. In accordance with certain aspects of the present disclosure, the owner-user mode parameters may include one or more functional parameters 312*f* comprising one or more parameters for configuring one or more functions of the EAC device according to an owner-user role; for example, parameters for establishing a data transfer interface with an owner-user client device and processing an access request/access credentials for an owner-user role to grant or deny access to the EAC device. The owner-user mode parameters may include one or more user parameters 314*f* comprising one or more parameters for authorizing/authenticating one or more users associated with the owner-user role, including configuring one or more owner-user ID and passcode, key code, key pair, authentication token, and the like. The owner-user mode parameters may include one or more security parameters 316*f* comprising one or more registry settings; account, file, directory permission settings; settings for functions, ports, protocols, and remote connections for the EAC device and/or a client device associated with an owner-user role; communications protocols between the EAC device and the client device; encryption parameters (e.g., cryptographic keypairs); session identifiers; verification of peer certificates for the client device; and the like.

Routine 500 may proceed by configuring the owner-user mode at the EAC server in accordance with the owner-user parameters 312*f*-316*f* (Step 504). Routine 500 may proceed by executing one or more steps or operations for provisioning the one or more EAC devices according to the owner-user mode (Step 506). Routine 500 may proceed by executing one or more steps or operations for updating or transitioning a current user mode for one or more EAC device to the owner-user mode (Step 508). In certain embodiments, step 508 may comprise transitioning a state of the EAC device at a state machine executing on the EAC device and/or a virtual state machine executing on the EAC server. Routine 500 may proceed by executing one or more steps or operations for receiving user data/credentials and/or access request data (e.g., comprising an EAC code) at a controller of the EAC device (Step 510). In certain embodiments, the EAC device may be configured to transition a current mode of the EAC device to the owner-user mode in response to the user data/credentials and/or access request data. In said embodiments, the user data/credentials and/or access request data may comprise an input in a state machine model. In accordance with certain aspects of the present disclosure, routine 500 may comprise one or more steps or operations for processing the user data/credentials and/or access request data according to the owner-user mode to execute one or more functions or operations (and/or restrict one or more functions or operations) according to the user data/credentials and/or access request data and the owner-user parameters 312*f*-316*f* (Step 512).

Figure 6:
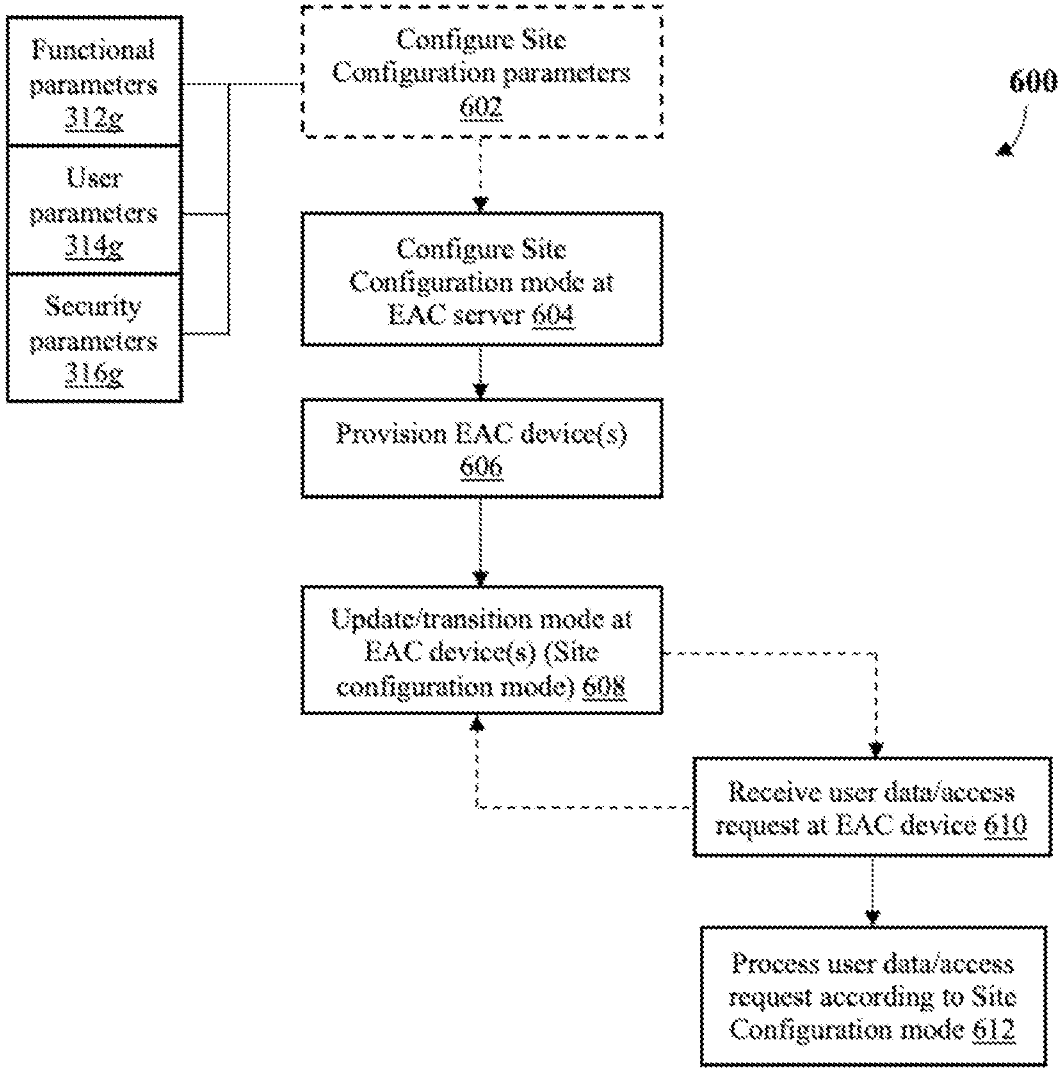
FIG. 6 is a process flow diagram of a routine of a multi-mode electronic access control system, in accordance with certain aspects of the present disclosure.

Referring now to FIG. 6, a process flow diagram of a routine 600 of a multi-mode electronic access control system is shown. In accordance with certain aspects of the present disclosure, routine 600 may comprise a routine of multi-mode electronic access control system 100, as shown in FIG. 1. Routine 600 may be successive/sequential to routine 300 of FIG. 3 and/or routine 400 of FIG. 4 and/or may comprise one or more sub-steps or sub-routines of routine 300 of FIG. 3 and/or routine 400 of FIG. 4. In accordance with certain aspects of the present disclosure, routine 600 may comprise one or more steps or operations 602-612 for configuring an EAC device according to a site configuration mode of operation. The site configuration mode of operation may comprise at least one mode in a plurality of separate/distinct modes within the multi-mode electronic access control system. In certain embodiments, the site configuration mode of operation may comprise the first mode of operation in step 420 in FIG. 4. In accordance with certain aspects of the present disclosure, the site configuration mode comprises one or more unique mode parameters for commanding/controlling one or more functions of the EAC device for the access-controlled site (e.g., access-controlled site 11 in FIG. 1).

In accordance with certain aspects of the present disclosure, routine 600 may comprise one or more steps or operations for configuring one or more site configuration mode parameters (Step 602). Step 602 may comprise one or more steps or operations for configuring the one or more site configuration mode parameters via one or more operations of an EAC application (e.g., EAC application 110 in FIG. 1) executing on the EAC server (e.g., EAC server 116 in FIG. 1) and/or one or more client devices (e.g., client devices 104*a*-*n* in FIG. 1). Step 602 may comprise one or more steps or operations for receiving one or more user-generated inputs at the one or more client devices via a graphical user interface of the EAC application. Step 602 may comprise one or more steps or operations for configuring the one or more site configuration mode parameters at the EAC server in response to the one or more user-generated inputs. In accordance with certain aspects of the present disclosure, the site configuration mode parameters may include one or more functional parameters 312*g* comprising one or more parameters for configuring one or more site configuration functions of the EAC device (e.g., parameters for granting an access request at a site asset for a specified period of time in response to valid access credentials); communication protocols for the EAC device; and data processing protocols for the EAC device. The site configuration mode parameters may include one or more user parameters 314*g* comprising one or more parameters for authorizing/authenticating one or more users associated with one or more user roles, including configuring one or more user IDs/passcodes, electronic key code(s), cryptographic key pair(s), authentication token(s), and the like. The site configuration mode parameters may include one or more security parameters 316*g* comprising one or more registry settings; account, file, directory permission settings; settings for functions, ports, protocols, and remote connections for the EAC device and/or client device(s); communications protocols between the EAC device and the client device(s); encryption parameters (e.g., cryptographic keypairs); session identifiers; verification of peer certificates for client device(s); and the like.

Routine 600 may proceed by configuring the site configuration mode at the EAC server in accordance with the site configuration parameters 312*g*-316*g* (Step 604). Routine 600 may proceed by executing one or more steps or operations for provisioning the one or more EAC devices according to the site configuration mode (Step 606). Routine 600 may proceed by executing one or more steps or operations for updating or transitioning a current operational mode for one or more EAC device to the site configuration mode (Step 608). In certain embodiments, step 608 may comprise transitioning a state of the EAC device via a state machine executing on the EAC device and/or a virtual state machine executing on the EAC server. Routine 600 may proceed by executing one or more steps or operations for receiving user data/credentials and/or access request data (e.g., an EAC code) at a controller of the EAC device (Step 610). In certain embodiments, the EAC device may be configured to transition a current operational mode of the EAC device to the site configuration mode in response to the user data/credentials and/or access request data. In said embodiments, the user data/credentials and/or access request data may comprise an input in a state machine model. In accordance with certain aspects of the present disclosure, routine 600 may comprise one or more steps or operations for processing the user data/credentials and/or access request data according to the site configuration mode to execute one or more functions or operations (and/or restrict one or more functions or operations) according to the user data/credentials and/or access request data and the site configuration parameters 312*g*-316*g* (Step 612).

Figure 7:
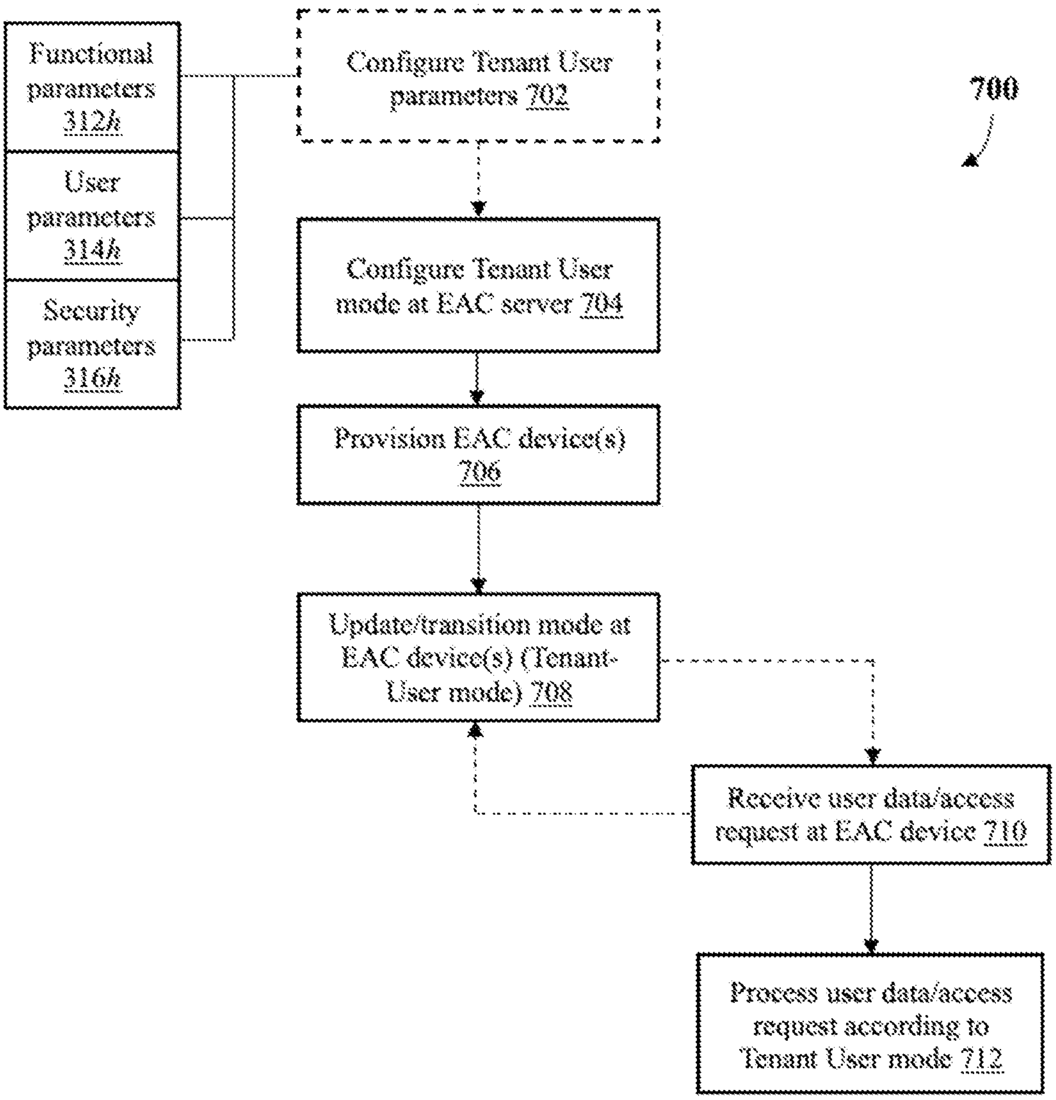
FIG. 7 is a process flow diagram of a routine of a multi-mode electronic access control system, in accordance with certain aspects of the present disclosure.

Referring now to FIG. 7, a process flow diagram of a routine 700 of a multi-mode electronic access control system is shown. In accordance with certain aspects of the present disclosure, routine 700 may comprise a routine of multi-mode electronic access control system 100, as shown in FIG. 1. Routine 700 may be successive/sequential to routine 300 of FIG. 3 and/or routine 400 of FIG. 4 and/or may comprise one or more sub-steps or sub-routines of routine 300 of FIG. 3 and/or routine 400 of FIG. 4. In accordance with certain aspects of the present disclosure, routine 700 may comprise one or more steps or operations 702-712 for configuring an EAC device according to a tenant-user mode of operation. The tenant-user mode of operation may comprise at least one mode in a plurality of separate/distinct modes within the multi-mode electronic access control system. In certain embodiments, the tenant-user mode of operation may comprise the first mode of operation in step 420 in FIG. 4. In accordance with certain aspects of the present disclosure, the tenant-user mode comprises one or more unique mode parameters for commanding/controlling one or more functions of the EAC device for at least one tenant-user role.

In accordance with certain aspects of the present disclosure, routine 700 may comprise one or more steps or operations for configuring one or more tenant-user mode parameters (Step 702). Step 702 may comprise one or more steps or operations for configuring the one or more tenant-user mode parameters via one or more operations of an EAC application (e.g., EAC application 110 in FIG. 1) executing on the EAC server (e.g., EAC server 116 in FIG. 1) and/or one or more client devices (e.g., client devices 104*a-n* in FIG. 1). Step 702 may comprise one or more steps or operations for receiving one or more user-generated inputs at the one or more client devices via a graphical user interface of the EAC application. Step 702 may comprise one or more steps or operations for configuring the one or more tenant-user mode parameters at the EAC server in response to the one or more user-generated inputs. In accordance with certain aspects of the present disclosure, the tenant-user mode parameters may include one or more functional parameters 312*h* comprising one or more parameters for configuring one or more functions of the EAC device according to a tenant-user role; for example, one or more communications protocols, data processing protocols, and/or device actions/outputs. The tenant-user mode parameters may include one or more user parameters 314*h* comprising one or more parameters for authorizing/authenticating one or more users associated with one or more user roles (e.g., tenant user and owner user), including configuring one or more user IDs/passcodes, electronic key code(s), cryptographic key pair(s), authentication token(s), and the like. The tenant-user mode parameters may include one or more security parameters 316*h* comprising one or more registry settings; account, file, directory permission settings; settings for functions, ports, protocols, and remote connections for the EAC device and/or client device(s); communications protocols between the EAC device and the client device(s); encryption parameters (e.g., cryptographic keypairs); session identifiers; verification of peer certificates for client device(s); and the like.

Routine 700 may proceed by configuring the tenant-user mode at the EAC server in accordance with the tenant-user parameters 312*h*-316*h* (Step 704). Routine 700 may proceed by executing one or more steps or operations for provisioning the one or more EAC devices according to the tenant-user mode (Step 706). Routine 700 may proceed by executing one or more steps or operations for updating or transitioning a current operational mode for one or more EAC device to the tenant-user mode (Step 708). In certain embodiments, step 708 may comprise transitioning a state of the EAC device via a state machine executing on the EAC device and/or a virtual state machine executing on the EAC server. Routine 700 may proceed by executing one or more steps or operations for receiving user data/credentials and/or access request data (e.g., an EAC code) at a controller of the EAC device (Step 710). In certain embodiments, the EAC device may be configured to transition a current operational mode of the EAC device to the tenant-user mode in response to the user data/credentials and/or access request data. In said embodiments, the user data/credentials and/or access request data may comprise an input in a state machine model. In accordance with certain aspects of the present disclosure, routine 700 may comprise one or more steps or operations for processing the user data/credentials and/or access request data according to the tenant-user mode to execute one or more functions or operations (and/or restrict one or more functions or operations) according to the user data/credentials and/or access request data and the tenant-user parameters 312*h*-316*h* (Step 712).

Figure 8:
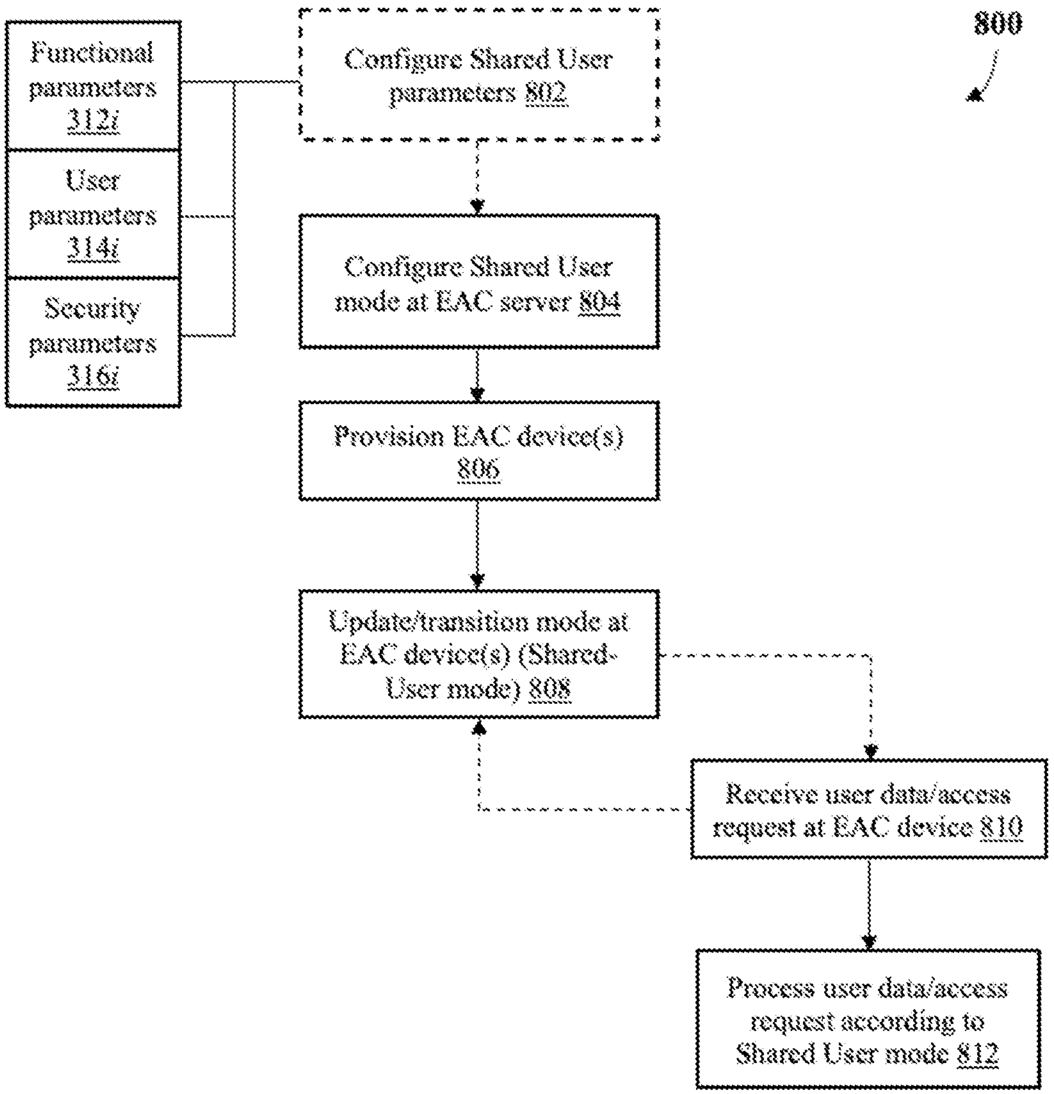
FIG. 8 is a process flow diagram of a routine of a multi-mode electronic access control system, in accordance with certain aspects of the present disclosure.

Referring now to FIG. 8, a process flow diagram of a routine 800 of a multi-mode electronic access control system is shown. In accordance with certain aspects of the present disclosure, routine 800 may comprise a routine of multi-mode electronic access control system 100, as shown in FIG. 1. Routine 800 may be successive/sequential to routine 300 of FIG. 3 and/or routine 400 of FIG. 4 and/or may comprise one or more sub-steps or sub-routines of routine 300 of FIG. 3 and/or routine 400 of FIG. 4. In accordance with certain aspects of the present disclosure, routine 800 may comprise one or more steps or operations 802-812 for configuring an EAC device according to a shared-user mode of operation. The shared-user mode of operation may comprise at least one mode in a plurality of separate/distinct modes within the multi-mode electronic access control system. In certain embodiments, the shared-user mode of operation may comprise the first mode of operation in step 420 in FIG. 4. In accordance with certain aspects of the present disclosure, the shared-user mode comprises one or more unique mode parameters for commanding/controlling one or more functions of the EAC device for at least one shared-user role.

In accordance with certain aspects of the present disclosure, routine 800 may comprise one or more steps or operations for configuring one or more shared-user mode parameters (Step 802). Step 802 may comprise one or more steps or operations for configuring the one or more shared-user mode parameters via one or more operations of an EAC application (e.g., EAC application 110 in FIG. 1) executing on the EAC server (e.g., EAC server 116 in FIG. 1) and/or one or more client devices (e.g., client devices 104*a-n* in FIG. 1). Step 802 may comprise one or more steps or operations for receiving one or more user-generated inputs at the one or more client devices via a graphical user interface of the EAC application. Step 802 may comprise one or more steps or operations for configuring the one or more shared-user mode parameters at the EAC server in response to the one or more user-generated inputs. In accordance with certain aspects of the present disclosure, the shared-user mode parameters may include one or more functional parameters 312*i* comprising one or more parameters for configuring one or more functions of the EAC device according to a shared-user role; for example, one or more communications protocols, data processing protocols, and/or device actions/outputs. The shared-user mode parameters may include one or more user parameters 314*i* comprising one or more parameters for authorizing/authenticating one or more users associated with one or more user roles (e.g., shared user and owner user), including configuring one or more user IDs/passcodes, electronic key code(s), cryptographic key pair(s), authentication token(s), and the like. The shared-user mode parameters may include one or more security parameters 316*i* comprising one or more registry settings; account, file, directory permission settings; settings for functions, ports, protocols, and remote connections for the EAC device and/or client device(s); communications protocols between the EAC device and the client device(s); encryption parameters (e.g., cryptographic keypairs); session identifiers; verification of peer certificates for client device(s); and the like.

Routine 800 may proceed by configuring the shared-user mode at the EAC server in accordance with the shared-user parameters 312*i*-316*i* (Step 804). Routine 800 may proceed by executing one or more steps or operations for provisioning the one or more EAC devices according to the shared-user mode (Step 806). Routine 800 may proceed by executing one or more steps or operations for updating or transitioning a current operational mode for one or more EAC device to the shared-user mode (Step 808). In certain embodiments, step 808 may comprise transitioning a state of the EAC device via a state machine executing on the EAC device and/or a virtual state machine executing on the EAC server. Routine 800 may proceed by executing one or more steps or operations for receiving user data/credentials and/or access request data (e.g., an EAC code) at a controller of the EAC device (Step 810). In certain embodiments, the EAC device may be configured to transition a current operational mode of the EAC device to the shared-user mode in response to the user data/credentials and/or access request data. In said embodiments, the user data/credentials and/or access request data may comprise an input in a state machine model. In accordance with certain aspects of the present disclosure, routine 800 may comprise one or more steps or operations for processing the user data/credentials and/or access request data according to the shared-user mode to execute one or more functions or operations (and/or restrict one or more functions or operations) according to the user data/credentials and/or access request data and the shared-user parameters 312*i*-316*i* (Step 812).

Figure 9:
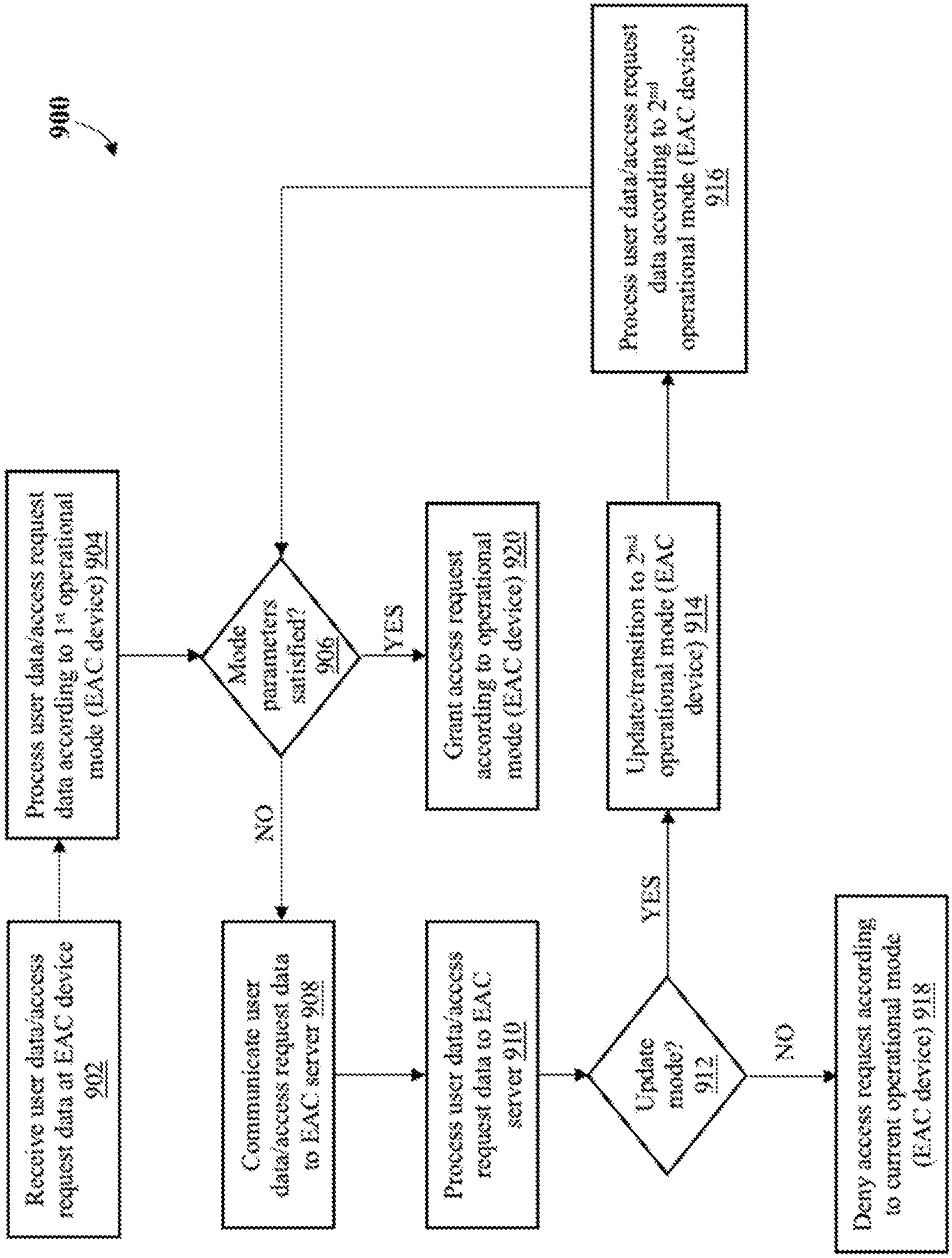
FIG. 9 is a process flow diagram of a routine of a multi-mode electronic access control system, in accordance with certain aspects of the present disclosure.

Referring now to FIG. 9, a process flow diagram of a routine 900 of a multi-mode electronic access control system is shown. In accordance with certain aspects of the present disclosure, routine 900 may comprise a routine of multi-mode electronic access control system 100, as shown in FIG. 1. Routine 900 may be successive/sequential to routine 300 of FIG. 3 and/or routine 400 of FIG. 4 and/or may comprise one or more sub-steps or sub-routines of routine 300 of FIG. 3 and/or routine 400 of FIG. 4. Routine 900 may comprise one or more operational modes configured in accordance with one or more steps or operations of routines 500-800 as shown in FIGS. 5-8. In accordance with certain aspects of the present disclosure, routine 900 comprises steps 902-920 for processing user data/access request data according to one or more operational modes and dynamically configuring one or more operations for an EAC device within a multi-mode electronic access control system to grant or deny an access request at an EAC device. One or more steps of routine 900 may be executed across one or more networked devices within the multi-mode electronic access control system including, for example, EAC server 116 of FIG. 1, one or more client devices 104*a*-*n* of FIG. 1, and/or one or more EAC devices 102*a*-*n* of FIG. 1.

In accordance with certain aspects of the present disclosure, routine 900 may comprise one or more steps or operations for receiving user data/access request data at an EAC device via a data transfer interface with a client device associated with at least one user within the multi-mode electronic access control system (Step 902). Routine 900 may proceed by executing one or more data processing steps for processing the user data/access request data according to a first (i.e., current) operational mode of the EAC device (Step 904). Routine 900 may comprise a first decision step 906 to determine whether one or more parameters for the first operational mode are satisfied based on the user data/access request data and/or one or more virtual (i.e., state-based) conditions. If YES, the mode parameters are satisfied, routine 900 may proceed by executing one or more steps or operations to grant the access request according to the first operational mode (Step 920). If NO, the mode parameters are not satisfied, routine 900 may proceed by executing one or more steps or operations for communicating the user data/access request data to the EAC server (Step 908). Step 908 may comprise one or more communication protocols between a client device and the EAC server and/or the EAC device and the EAC server. Routine 900 may proceed by performing one or more steps or operations for processing the user data/access request data at the EAC server according to one or more data processing parameters and/or mode configurations (Step 910). In certain embodiments, step 910 comprises one or more steps or operations for processing the user data/access request data at the EAC server according to a virtual finite state machine comprising one or more states corresponding to one or more operational modes. In accordance with certain aspects of the present disclosure, routine 900 may comprise a decision step 912 for determining whether to update (i.e., transition) the operational mode for the first EAC device from the first operational mode to a second operational mode according to the one or more data processing parameters and/or mode configurations. In certain embodiments, step 912 may comprise processing one or more inputs/conditions according to a state machine model to determine whether to effect one or more state transition for the EAC device. If an output of decision step 912 is NO, one or more parameters for updating the EAC device from the first mode to the second mode are not satisfied, then routine 900 may proceed by executing one or more steps or operations for denying the access request according to the first (i.e., current) operational mode at the EAC device (Step 918). If an output of decision step 912 is YES, the parameters for updating the EAC device from the first mode to the second mode are satisfied, then routine 900 may proceed by executing one or more steps or operations for updating/transitioning the operational mode for the EAC device from the first mode to the second mode (Step 914). Routine 900 may proceed by executing one or more steps or operations for processing the user data/access request data according to the second operational mode (Step 916). In accordance with certain embodiments, routine 900 may proceed to step 906 to determine whether to grant or deny the access request based on the user data/access request data and the parameters for the second operational mode. In accordance with certain aspects of the present disclosure, routine 900 enables one or more dynamic modes for the EAC device based on the user data/access request data and/or one or more mode parameters and conditions.

Figure 10:
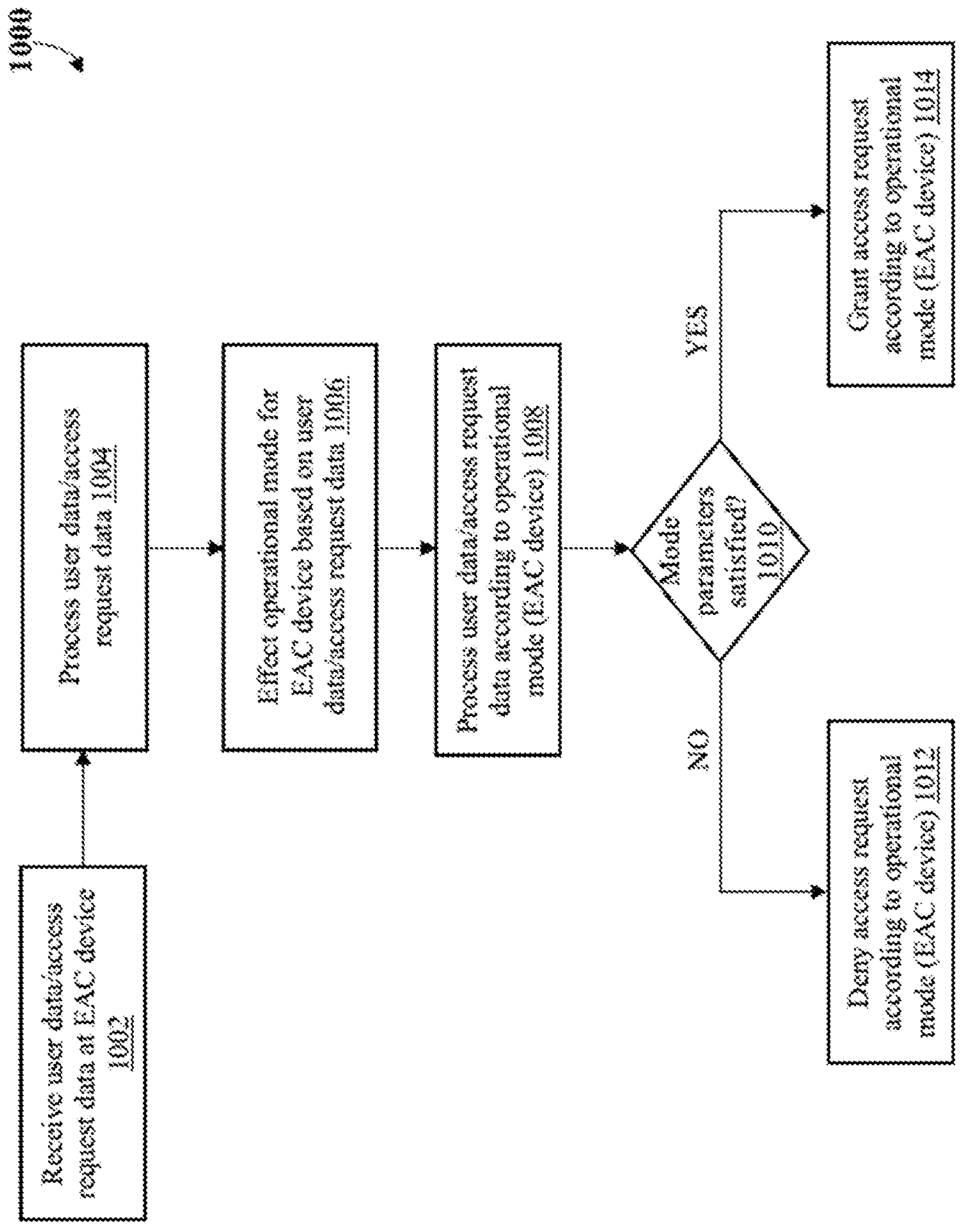
FIG. 10 is a process flow diagram of a routine of a multi-mode electronic access control system, in accordance with certain aspects of the present disclosure.

Referring now to FIG. 10, a process flow diagram of a routine 1000 of a multi-mode electronic access control system is shown. In accordance with certain aspects of the present disclosure, routine 1000 may comprise a routine of multi-mode electronic access control system 100, as shown in FIG. 1. Routine 1000 may comprise one or more operational modes configured in accordance with one or more steps or operations of routines 500-800 as shown in FIGS. 5-8. In accordance with certain aspects of the present disclosure, routine 1000 comprises steps 1002-1014 for processing user data/access request data according to one or more operational modes within a multi-mode electronic access control system to grant or deny an access request at an EAC device.

One or more steps of routine 1000 may be executed across one or more networked devices within the multi-mode electronic access control system including, for example, EAC server 116 of FIG. 1, one or more client devices 104*a-n* of FIG. 1, and/or one or more EAC devices 102*a-n* of FIG. 1.

In accordance with certain aspects of the present disclosure, routine 1000 may comprise one or more steps or operations for receiving user data/access request data at an EAC device via a data transfer interface with a client device associated with at least one user within the multi-mode electronic access control system (Step 1002). Routine 1000 may proceed by executing one or more data processing steps for processing the user data/access request data according to one or more mode parameters (Step 1004). In accordance with certain aspects of the present disclosure, routine 1000 may effect an operational mode for the EAC device according to an output of step 1004 (Step 1006). In certain embodiments, step 1004 may comprise processing the user data/access request data according to a state machine model to determine at least one mode transition for the EAC device (Step 1008). Routine 1000 may further comprise a first decision step 1010 comprising one or more steps or operations for determining whether one or more parameters for the operational mode are satisfied based on the user data/access request data and/or one or more virtual (i.e., state-based) conditions. If NO, the mode parameters are not satisfied, then routine 1000 may proceed by executing one or more steps or operations for denying the access request according to the operational mode at the EAC device (Step 1012). If YES, the mode parameters are satisfied, routine 1000 may proceed by executing one or more steps or operations to grant the access request according to the first operational mode at the EAC device (Step 1014). In accordance with certain aspects of the present disclosure, routine 1000 is configured to effect an operational mode at the EAC device based on the user data/access request data and/or one or more mode parameters and conditions to grant or deny an access request.

Figure 11:
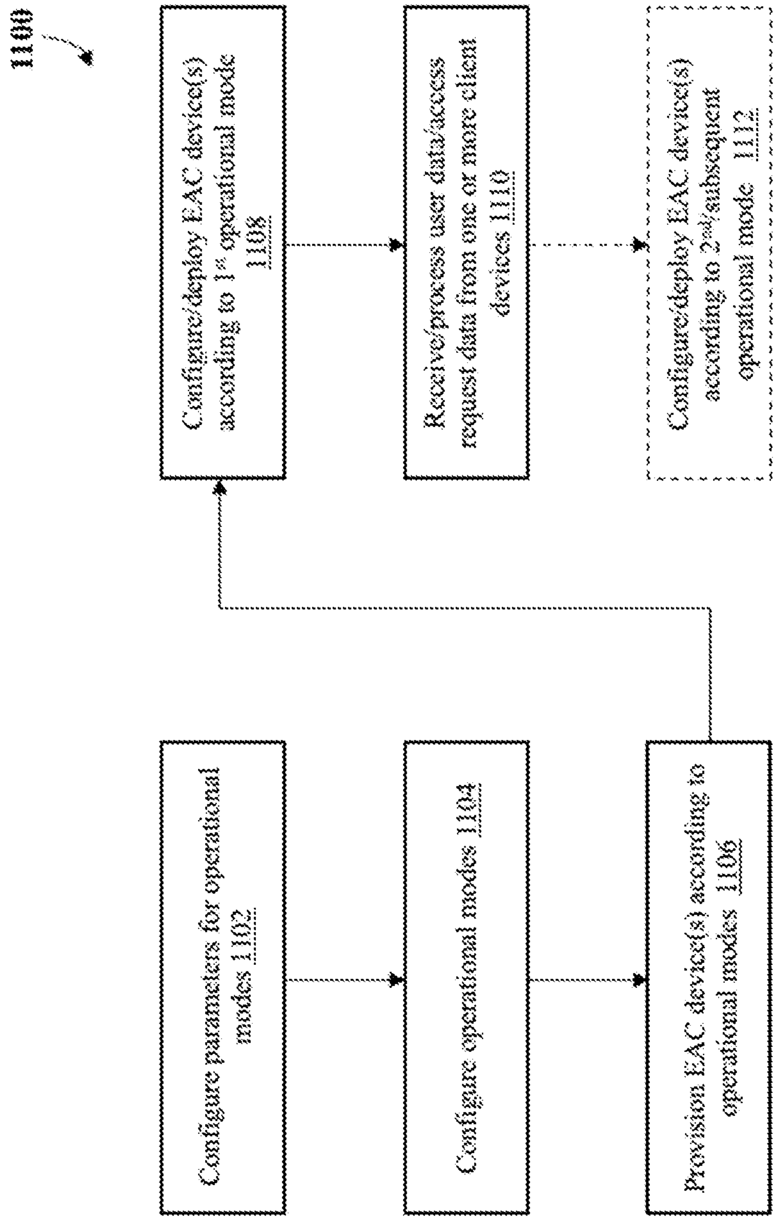
FIG. 11 is a method flow diagram of a multi-mode electronic access control method, in accordance with certain aspects of the present disclosure.

Referring now to FIG. 11, a method flow diagram of a multi-mode electronic access control method 1100 is shown. One or more steps of method 1100 may be executed across one or more networked devices within a multi-mode electronic access control system (e.g., system 100 of FIG. 1); including, for example, EAC server 116 of FIG. 1, one or more client devices 104*a-n* of FIG. 1, and/or one or more EAC devices 102*a-n* of FIG. 1. In accordance with certain aspects of the present disclosure, method 1100 may comprise one or more steps or operations for configuring (e.g., with the EAC server) a plurality of mode parameters for a plurality of operational modes for one or more EAC devices within the multi-mode electronic access control system (Step 1102). The parameters for operation of the electronic access control device may comprise one or more security parameters, user parameters, or functional parameters. In accordance with certain aspects of the present disclosure, method 1100 may comprise one or more steps or operations for configuring (e.g., with the EAC server) a plurality of operational modes for an electronic access control device (Step 1104). In certain embodiments, each operational mode in the plurality of operational modes may comprise a different set of parameters for commanding one or more functions or operations of the EAC device. Method 1100 may proceed by executing one or more steps or operations for provisioning (e.g., with the EAC server) the electronic access control device with the plurality of operational modes (Step 1106). Method 1100 may proceed by executing one or more steps or operations for configuring and/or deploying (e.g., with the EAC server) the EAC device according to a first mode of operation (Step 1108). Method 1100 may proceed by executing one or more steps or operations for receiving and processing user data and/or access request data from one or more client device(s) at the EAC device according to the first mode of operation to perform or restrict one or more functions of the EAC device according to the first mode of operations, including granting or denying at least one access request (Step 1110). In accordance with certain embodiments, method 1100 may comprise one or more steps or operations for configuring and deploying (e.g., with the EAC server) the EAC device according to a second mode of operation based on the user data and/or access request data from the one or more client devices (Step 1112). In accordance with certain aspects of the present disclosure, the second mode of operation may be configured according to one or more of the security parameters, user parameters, or functional parameters that are different from those of the first mode of operation.

In accordance with certain aspects of the present disclosure, method 1100 may further comprise one or more steps or operations for configuring (e.g., with the EAC server and/or the at least one client device) the electronic access control device according to a third mode of operation, wherein the third mode of operation is configured to restrict one or more functions of the electronic access control device according to one or more installation or testing parameters. Method 1100 may further comprise one or more steps or operations for configuring (e.g., with the EAC server and/or the at least one client device) the electronic access control device according to a third mode of operation, wherein the second mode of operation is configured according to at least one first user role and the third mode of operation is configured according to at least one second user role. Method 1100 may further comprise one or more steps or operations for configuring (e.g., with the EAC server and/or the at least one client device) the second mode of operation according to a first set of user parameters. Method 1100 may further comprise one or more steps or operations for configuring (e.g., with the EAC server and/or the at least one client device) the second mode of operation according to a first set of site parameters. Method 1100 may further comprise one or more steps or operations for configuring (e.g., with the EAC server and/or the at least one client device) the second mode of operation according to one or more installation or testing parameters. In certain embodiments, the first mode of operation comprises a first set of security parameters and the second mode of operation comprises a second set of security parameters. The first set of user parameters may be associated with a first user or a first user role and the second set of security parameters may be associated with a second (or subsequent) user or a second (or subsequent) user role. In certain embodiments, the third mode of operation may be configured according to one or more shared user roles.

Figure 12:
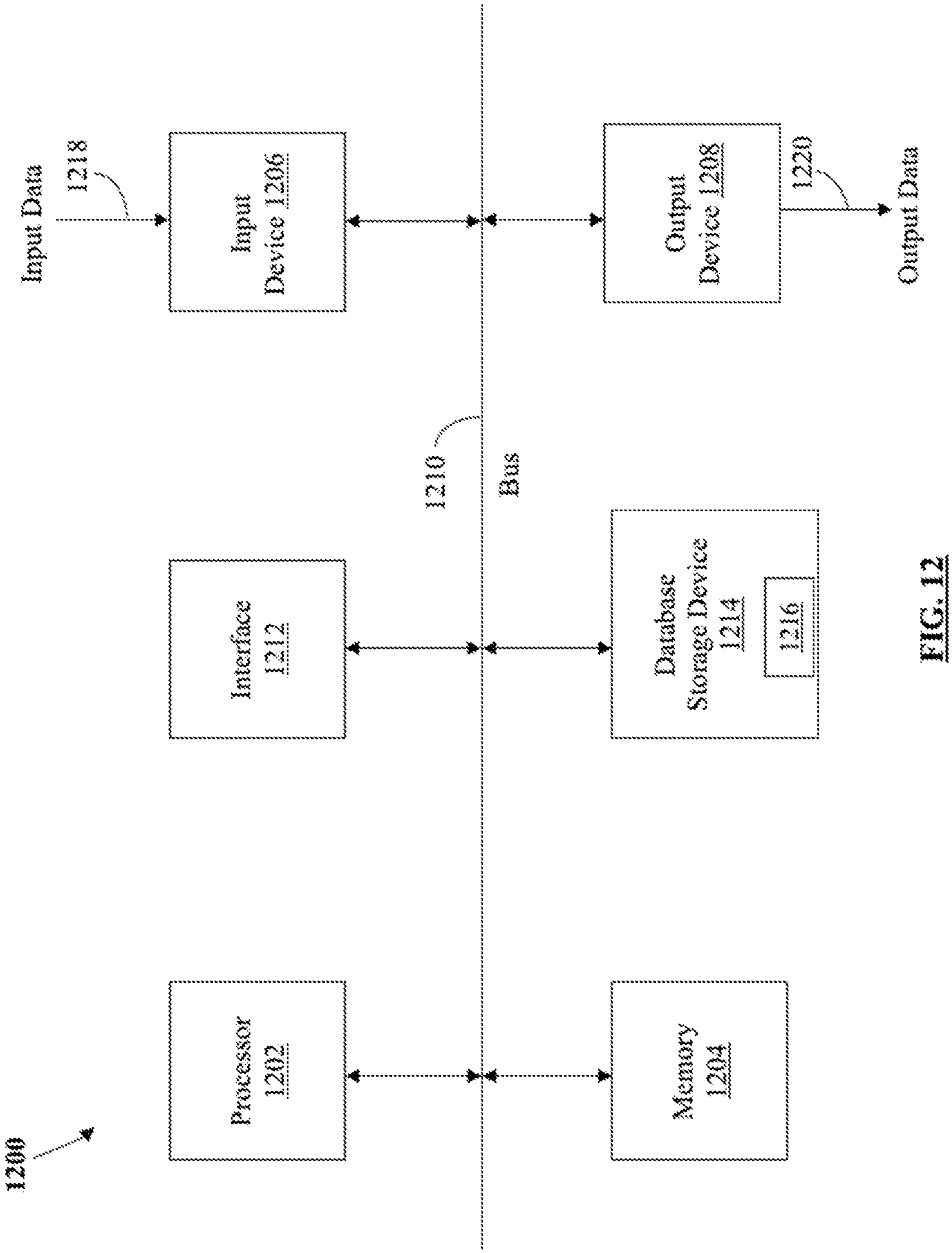
FIG. 12 is an illustrative embodiment of a computing device through which one or more aspects of the present disclosure may be implemented.

Referring now to FIG. 12, a processing system 1200 in which one or more aspects of the present disclosure may be implemented is shown. For example, processing system 1200 may comprise one or more devices and systems of the present disclosure including, but not limited to, one or more mobile electronic device, server, alarm system controller, electronic access controller, electronic access control system interface, and the like. According to an embodiment, processing system 1200 may generally comprise at least one processor 1202, or processing unit or plurality of processors, a memory 1204, at least one input device 1206 and at least one output device 1208, coupled together via a bus or group of buses 1210. In certain embodiments, input device 1206 and output device 1208 could be the same device. An interface 1212 can also be provided for coupling the processing system 1200 to one or more peripheral devices; for example, interface 1212 could be a PCI card or PC card. At least one storage device 1214 which houses at least one database 1216 can also be provided. The memory 1204 can be any form of memory device, for example, volatile or non-volatile memory, solid state storage devices, magnetic devices, etc. The processor 1202 could comprise more than one distinct processing device, for example to handle different functions within the processing system 1200. Input device 1206 receives input data 1218 and can comprise, for example, a keyboard, a pointer device such as a pen-like device or a mouse, audio receiving device for voice-controlled activation such as a microphone, data receiver or antenna (e.g., radio frequency transceiver), a modem or wireless data adaptor, data acquisition card, etc. Input data 1218 could come from different sources, for example keyboard instructions in conjunction with data received via a network. Output device 1208 produces or generates output data 1220 and can comprise, for example, a display device or monitor in which case output data 1220 is visual, a printer in which case output data 1220 is printed, a port for example a USB port, a peripheral component adaptor, a data transmitter or antenna such as a modem or wireless network adaptor, BLUETOOTH, NFC, RFID, LoRA, etc. Output data 1220 could be distinct and derived from different output devices, for example a visual display on a monitor in conjunction with data transmitted to a network. A user could view data output, or an interpretation of the data output, on, for example, a monitor or using a printer. The storage device 1214 can be any form of data or information storage means, for example, volatile or non-volatile memory, solid state storage devices, magnetic devices, etc.

In use, the processing system 1200 is adapted to allow data or information to be stored in and/or retrieved from, via wired or wireless communication means, at least one database 1216. The interface 1212 may allow wired and/or wireless communication between the processing unit 1202 and peripheral components that may serve a specialized purpose. In general, the processor 1202 can receive instructions as input data 1218 via input device 1206 and can display processed results or other output to a user by utilizing output device 1208. More than one input device 1206 and/or output device 1208 can be provided. It should be appreciated that the processing system 1200 may be any form of terminal, server, specialized hardware, or the like.

It is to be appreciated that the processing system 1200 may be a part of a networked communications system. Processing system 1200 could connect to a network, for example the Internet or a WAN. Input data 1218 and output data 1220 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 1200 illustrated in FIG. 12 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 12 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 1200 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 1200, or portions thereof, may be stored in a remote memory storage device. It is to be appreciated that the illustrated network connections of FIG. 12 are exemplary and other means of establishing a communications link between multiple computers may be used.

FIG. 12 is intended to provide a brief, general description of an illustrative and/or suitable exemplary environment in which embodiments of the below described present invention may be implemented. FIG. 12 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

As provided in the foregoing detailed description of the several views of the drawings, certain embodiments have been described with reference to acts and symbolic representations of operations that are performed by one or more computing devices, such as the computing system environment 1200 of FIG. 12. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations, including, but not limited to, those provided herein. Examples of well-known computing systems, environments, and configurations that may be suitable for use with an embodiment include, but are not limited to, smart phones, tablet computers, electronic access control devices, personal computers, handheld or laptop devices, personal digital assistants, multiprocessor systems, microprocessor-based systems, set top boxes, programmable consumer electronics, network, minicomputers, server computers, electronic access control server computers, alarm system server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

As will be appreciated by one of skill in the art, one or more aspects of the present disclosure may be embodied as a method (including, for example, a computer-implemented process, a system routine, and/or any other process), an apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be performed in an order other than the order illustrated, may be combined or divided, or may be performed simultaneously. It will also be understood that the blocks of the block diagrams illustrate, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While certain exemplary embodiments have been described and shown in the accompanying drawings, it is to be understood that such embodiments are merely illustrative of, and not restrictive on, the broad invention, and that this invention is not limited to the specific constructions and arrangements shown and described, since various other changes, combinations, omissions, modifications and substitutions, in addition to those set forth in the above paragraphs, are possible. Those skilled in the art will appreciate that various adaptations and modifications of the described embodiments can be configured without departing from the scope and spirit of the invention. Therefore, it is to be understood that, within the scope of the appended claims, the invention may be practiced other than as specifically described herein.

What is claimed is:

1. An electronic access control method comprising:

configuring, with at least one processor, a plurality of operational modes for an electronic access control device, wherein each operational mode in the plurality of operational modes comprises a different set of parameters for operation of the electronic access control device, wherein the parameters for operation of the electronic access control device comprise one or more security parameters, user parameters, or functional parameters;

provisioning, with the at least one processor, the electronic access control device with the plurality of operational modes;

configuring, with the at least one processor, the electronic access control device according to a first mode of operation;

configuring, with the at least one processor, the electronic access control device according to a second mode of operation;

configuring, with the at least one processor, the electronic access control device according to a third mode of operation, wherein the third mode of operation is configured to restrict one or more functions of the electronic access control device according to one or more installation or testing parameters; and wherein the second mode of operation is configured according to one or more of the security parameters, user parameters, or functional parameters, wherein the second mode of operation is different from the first mode of operation.

2. The electronic access control method of claim 1 further comprising configuring, with the at least one processor, the electronic access control device according to a third mode of operation, wherein the second mode of operation is configured according to at least one first user role and the third mode of operation is configured according to at least one second user role.

3. The electronic access control method of claim 1 further comprising configuring, with the at least one processor, the second mode of operation according to a first set of user parameters.

4. The electronic access control method of claim 1 further comprising configuring, with the at least one processor, the second mode of operation according to a first set of site parameters.

5. The electronic access control method of claim 1 further comprising configuring, with the at least one processor, the second mode of operation according to one or more installation or testing parameters.

6. The electronic access control method of claim 1 wherein the first mode of operation comprises a first set of security parameters and the second mode of operation comprises a second set of security parameters.

7. The electronic access control method of claim 3 wherein the first set of user parameters are associated with a first user or a first user role.

8. The electronic access control method of claim 2 wherein the third mode of operation is configured according to one or more shared user roles.

9. An electronic access control system comprising:

at least one first computing device; and an electronic access control device communicably engaged with the at least one first computing device, wherein the at least one first computing device comprises at least one processor and a non-transitory computer readable medium comprising processor-executable instructions stored thereon that, when executed, command the at least one processor to perform one or more operations, the one or more operations comprising:

configuring a plurality of operational modes for the electronic access control device, wherein each operational mode in the plurality of operational modes comprises a different set of parameters for operation of the electronic access control device, wherein the parameters for operation of the electronic access control device comprise one or more security parameters, user parameters, or functional parameters;

provisioning the electronic access control device with the plurality of operational modes; and configuring the electronic access control device according to a first mode of operation, wherein the plurality of operational modes comprises at least one second mode of operation, wherein the electronic access control device is configurable between the first mode of operation and the at least one second mode of operation, wherein the at least one second mode of operation is configured according to one or more of the security parameters, user parameters, or functional parameters, wherein the at least one second mode of operation is different from the first mode of operation, and wherein the electronic access control device is configured according to a third mode of operation, wherein the third mode of operation is configured to restrict one or more functions of the electronic access control device according to one or more installation or testing parameters.

10. The electronic access control system of claim 9 further comprising at least one client device communicably engaged with the electronic access control device via at least one data transfer interface.

11. The electronic access control system of claim 10 wherein the at least one client device is operably configured to configure the electronic access control device from the first mode of operation to the at least one second mode of operation.

12. The electronic access control system of claim 9 wherein the at least one second mode of operation comprises a first set of user parameters that are different from the first mode of operation.

13. The electronic access control system of claim 9 wherein the at least one second mode of operation comprises a first set of site parameters that are different from the first mode of operation.

14. The electronic access control system of claim 9 wherein the at least one second mode of operation comprises one or more installation or testing parameters that are different from the first mode of operation.

15. An electronic access control system comprising:

a server; and an electronic access control device communicably engaged with the server;

wherein the electronic access control device is configurable according to a plurality of operational modes, wherein each operational mode in the plurality of operational modes comprises a different set of parameters for operation of the electronic access control device, wherein the parameters for operation of the electronic access control device comprise one or more security parameters, user parameters, or functional parameters, wherein the electronic access control device is configured according to a first mode of operation, wherein the server is configured to configure the electronic access control device from the first mode of operation to a second mode of operation, wherein the second mode of operation is configured according to one or more of the security parameters, user parameters, or functional parameters, wherein the second mode of operation is different from the first mode of operation, and wherein the electronic access control device is configured according to a third mode of operation, wherein the third mode of operation is configured to restrict one or more functions of the electronic access control device according to one or more installation or testing parameters.

16. The electronic access control system of claim 15 further comprising at least one client device communicably engaged with the electronic access control device and the server.

17. The electronic access control system of claim 16 wherein the at least one client device is configured to configure the electronic access control device from the first mode of operation to the second mode of operation.

18. The electronic access control system of claim 15 wherein the second mode of operation comprises one or more installation or testing parameters that are different from the first mode of operation.

19. The electronic access control system of claim 15 wherein the second mode of operation comprises a first set of user parameters that are different from the first mode of operation.

* * * * *